United States Patent
Kim et al.

(10) Patent No.: US 11,019,149 B2
(45) Date of Patent: May 25, 2021

(54) HUB APPARATUS AND METHOD FOR PROVIDING SERVICE THEREOF

(71) Applicant: Samsung Electronics Co., Ltd., Gyeonggi-do (KR)

(72) Inventors: Sung-jin Kim, Seoul (KR); Kwang-min Byeon, Chungcheongnam-do (KR); Ho-chul Shin, Gyeonggi-do (KR); Hee-bum Ahn, Seoul (KR); Doo-woong Lee, Seoul (KR); Kyu-sub Kwak, Seoul (KR); Jae-keun Na, Gyeonggi-do (KR); Sun-min Park, Seoul (KR); Taik-heon Rhee, Seoul (KR); Jae-hyuck Shin, Gyeonggi-do (KR); Sang-wook Lee, Gyeonggi-do (KR); Hyun-jung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 162 days.

(21) Appl. No.: 15/207,145

(22) Filed: Jul. 11, 2016

(65) Prior Publication Data

US 2017/0013062 A1    Jan. 12, 2017

(30) Foreign Application Priority Data

Jul. 10, 2015    (KR) .......................... 10-2015-0098176
Feb. 26, 2016    (KR) .......................... 10-2016-0023480

(51) Int. Cl.
*H04L 29/08*    (2006.01)
*H04L 12/28*    (2006.01)

(52) U.S. Cl.
CPC ........ *H04L 67/125* (2013.01); *H04L 12/2818* (2013.01); *H04L 12/2825* (2013.01); *H04L 12/2834* (2013.01)

(58) Field of Classification Search
CPC .......... G08B 13/19656; G08B 13/1966; G08B 13/19615; G08B 26/007; H04N 21/4227;
(Continued)

(56) References Cited

U.S. PATENT DOCUMENTS 7,378,962 B2    5/2008    Odenwald et al.
7,379,778 B2    5/2008    Hayes et al.
(Continued)

FOREIGN PATENT DOCUMENTS

CN    102238236    11/2011
CN    103197635    7/2013
(Continued)

OTHER PUBLICATIONS

Tech-Holic Team, Electronic Time Internet, http://www.etnews.com/20140901000038, Sep. 9, 2014.
(Continued)

*Primary Examiner* — Hitesh Patel
(74) *Attorney, Agent, or Firm* — The Farrell Law Firm, P.C.

(57) ABSTRACT

A hub apparatus and a method are provided for selecting a device. The method includes receiving a service request; determining a sensor based on the received service request; receiving state information from a device including the determined sensor; and selecting the device based on the received state information.

12 Claims, 36 Drawing Sheets

(58) Field of Classification Search
CPC .......... H04N 1/00002; H04N 1/00037; H04N 1/00061; H04N 1/00344; H04N 1/32662; H04W 4/008; H04W 4/021; H04W 60/04; G06Q 30/02
See application file for complete search history.

(56) References Cited

U.S. PATENT DOCUMENTS

| | | | |
|---|---|---|---|
| 7,957,528 B2 | 6/2011 | Iwamura | |
| 8,184,565 B2 | 5/2012 | Lim et al. | |
| 8,386,082 B2 | 2/2013 | Oswald | |
| 8,467,887 B2 | 6/2013 | Jung et al. | |
| 8,547,890 B2 | 10/2013 | Lee et al. | |
| 8,577,392 B1 | 11/2013 | Pai et al. | |
| 8,868,220 B2 | 10/2014 | Crucs | |
| 9,291,357 B1* | 3/2016 | Hasan | H04L 67/125 |
| 2006/0259184 A1* | 11/2006 | Hayes | G05B 15/02 |
| | | | 700/221 |
| 2007/0251998 A1* | 11/2007 | Belenki | G06N 3/126 |
| | | | 235/380 |
| 2009/0259865 A1 | 10/2009 | Sheynblat et al. | |
| 2010/0141406 A1 | 6/2010 | Jo et al. | |
| 2010/0150041 A1 | 6/2010 | Lim et al. | |
| 2011/0022733 A1* | 1/2011 | Karaoguz | H04L 67/303 |
| | | | 709/247 |
| 2011/0077056 A1 | 3/2011 | Park et al. | |
| 2011/0143779 A1 | 6/2011 | Rowe et al. | |
| 2013/0124736 A1 | 5/2013 | Park et al. | |
| 2014/0025975 A1 | 1/2014 | Namgoong et al. | |
| 2014/0075075 A1 | 3/2014 | Morrill et al. | |
| 2014/0241354 A1 | 8/2014 | Shuman et al. | |
| 2014/0249760 A1* | 9/2014 | Proud | G06Q 20/0855 |
| | | | 702/19 |
| 2014/0343698 A1* | 11/2014 | Kakuta | H02J 13/00004 |
| | | | 700/90 |
| 2014/0355478 A1 | 12/2014 | Cha | |
| 2015/0007164 A1 | 1/2015 | Hong et al. | |
| 2015/0061859 A1 | 3/2015 | Matsuoka et al. | |
| 2015/0156266 A1 | 6/2015 | Gupta | |
| 2015/0201022 A1 | 7/2015 | Kim et al. | |
| 2015/0312394 A1* | 10/2015 | Mirza | H04M 1/7253 |
| | | | 455/420 |
| 2016/0182170 A1* | 6/2016 | Daoura | H04W 12/033 |
| | | | 455/3.01 |
| 2016/0234034 A1* | 8/2016 | Mahar | G05B 15/02 |
| 2016/0248847 A1* | 8/2016 | Saxena | H04L 67/18 |
| 2018/0246559 A1 | 8/2018 | Namgoong et al. | |
| 2019/0266001 A1* | 8/2019 | Harada | H04L 67/34 |

FOREIGN PATENT DOCUMENTS

| | | |
|---|---|---|
| CN | 103458138 | 12/2013 |
| CN | 103576852 | 2/2014 |
| CN | 103645686 | 3/2014 |
| CN | 103996281 | 8/2014 |
| CN | 103997441 | 8/2014 |
| CN | 104279702 | 1/2015 |
| JP | 5210502 | 6/2013 |
| KR | 10-0942352 | 2/2010 |
| KR | 10-1038783 | 5/2011 |
| KR | 10-1128818 | 3/2012 |
| KR | 10-2012-0059860 | 6/2012 |
| KR | 10-2013-0056733 | 5/2013 |
| KR | 10-1334457 | 11/2013 |
| KR | 10-2015-0002228 | 1/2015 |
| WO | WO 2013/091442 | 6/2013 |
| WO | WO 2014/010784 | 1/2014 |
| WO | WO 2014/092503 | 6/2014 |
| WO | WO 2014/182692 | 11/2014 |

OTHER PUBLICATIONS

Kang, Chang Ho, et al., Study on Interference Localization using DRSS/AOA Integrated Method, KGS2012-Proceedings, pp. 103-104, 2012.
Han, Hyeun-Jin, et al., A Method to Improve Location Estimation of Sensor Node, KICS2009-10-450, Sep. 2012, vol. 24 No. 12.
Charith Perera et al., "Dynamic Configuration of Sensors using Mobile Sensor Hub in Internet of Things Paradigm", Apr. 2-5, 2013, 7 pages.
International Search Report dated Oct. 25, 2016 issued in counterpart application No. PCT/KR2016/007479, 9 pages.
European Search Report dated Jun. 7, 2018 issued in counterpart application No. 16824677.5-1213, 8 pages.
European Search Report dated Apr. 8, 2020 issued in counterpart application No. 16824677.5-1213, 4 pages.
Research of Smart Home System Based on Internet of Things Technology, Software Guide, vol. 13, No. 7, Jul. 2014, 4 pages.
Chinese Office Action dated Jun. 28, 2020 issued in counterpart application No. 201680040851.6, 24 pages.
Indian Examination Report dated Nov. 24, 2020 issued in counterpart application No. 201817003960, 6 pages.

* cited by examiner

FIG. 9

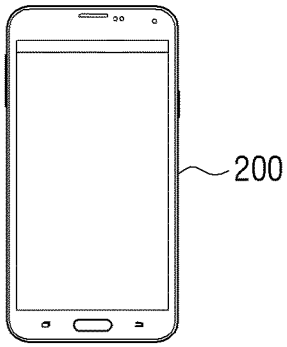
200

① REQUEST COOLING SERVICE

⑧ RESPOND TO SERVICE PERFORMANCE

② DETERMINE SENSOR NECESSARY FOR SERVICE

| TEMPERATURE SENSOR | HUMIDITY SENSOR | IR SENSOR | DOOR OPENING DETECTION SENSOR |

100

③ FORM DEVICE GROUP

| 1ST DEVICE | 2ND DEVICE | 3RD DEVICE |

⑦ PERFORM SERVICE BASED ON SENSING INFORMATION

④ REQUEST SENSING INFORMATION

⑥ TRANSMIT SENSING INFORMATION

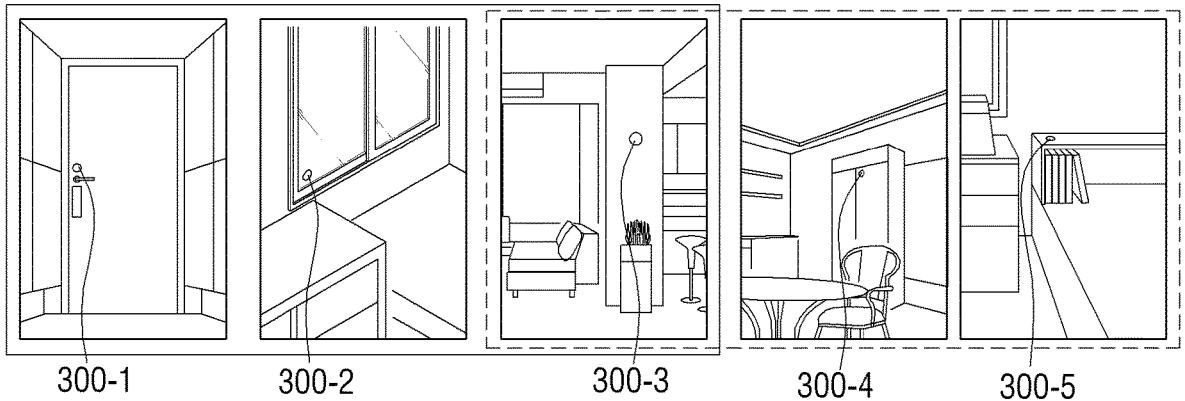

300-1    300-2    300-3    300-4    300-5

⑤ ACQUIRE SENSING INFORMATION

EXISTING DEVICE GROUP

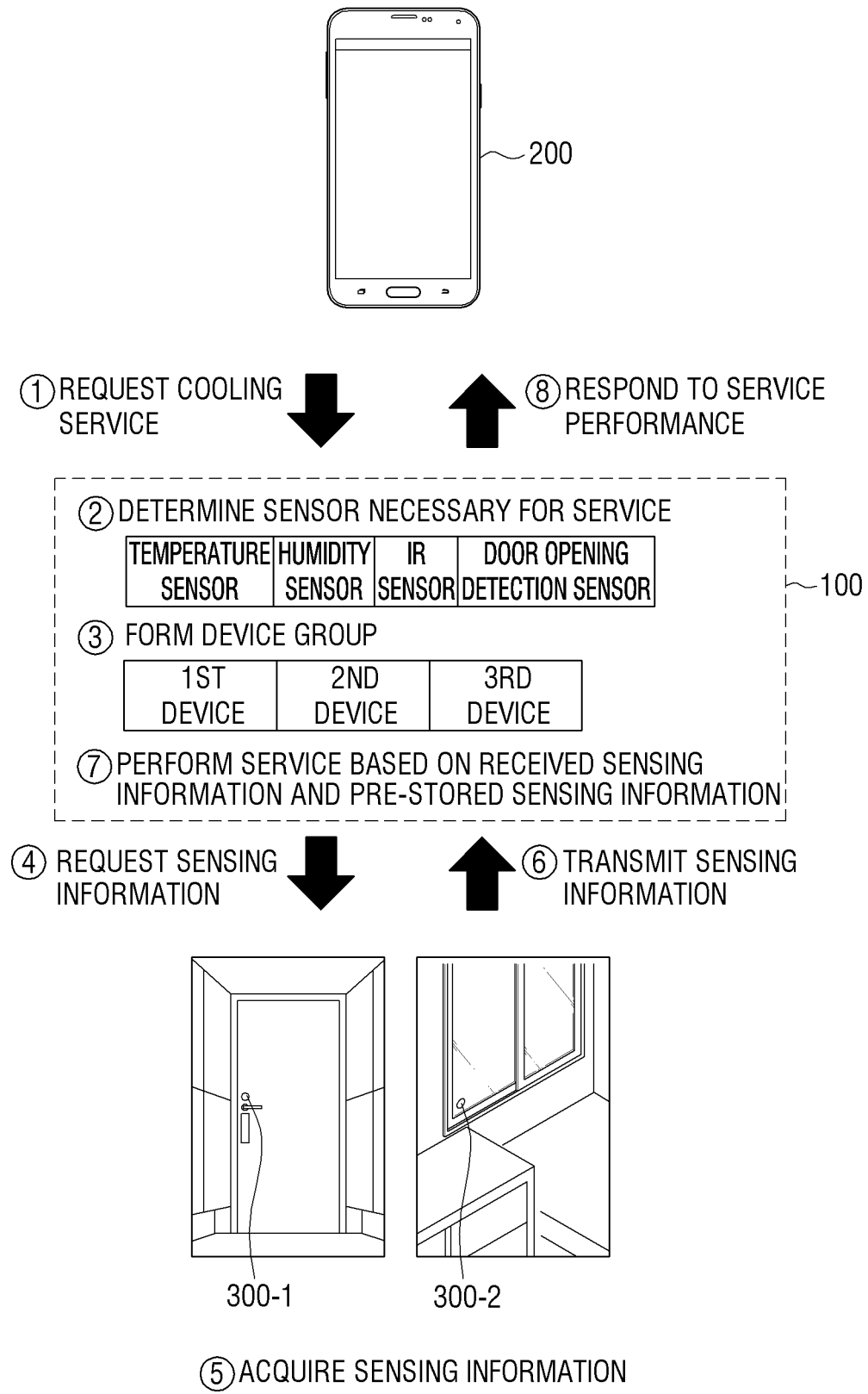

HUB APPARATUS AND METHOD FOR PROVIDING SERVICE THEREOF

PRIORITY

This application claims priority under 35 U.S.C. § 119(a) to Korean Patent Application Nos. 10-2015-0098176 and 10-2016-0023480, which were filed in the Korean Intellectual Property Office on Jul. 10, 2015 and Feb. 26, 2016, respectively, the entire disclosure of each of which is incorporated herein by reference.

BACKGROUND

1. Field of the Disclosure

The present disclosure relates generally to a hub apparatus and a method for providing a service thereof, and more particularly, to a method and a hub apparatus which, in response to a user's service request being received, perform a service requested by the user using sensing information received from a plurality of devices.

2. Description of the Related Art

The Internet of Things (IoT) refers to a service through which connected devices exchange information collected through a device provided with a sensor, without user intervention, and process jobs. While various services using the IoT are being developed, many patch type devices and services of various standards and functions are randomly distributed at the present time without being standardized. Accordingly, conventional IoT has a number of problems.

For example, because a conventional patch type device does not have a separate input/output device, the patch type device is inconveniently set up using another device, e.g., a user performs several steps to set the purpose of the conventional patch type device through an input menu, which is often provided in the form of a mobile terminal.

In addition, because the role of the patch type device is limited and specialized, the user should buy a new device to add a new service. In addition, when the user stops using the service, the previously purchased device cannot be used anymore.

In addition, the conventional service has trouble varying for different users. For example, in the case of a related-art smart home solution, the same service and the same information are provided to all users, despite the fact that a parent's interest and a child's interest are different.

In addition, because a service is provided and managed for each device, it is difficult to maintain a frequently used device and manage power.

SUMMARY

An aspect of the present disclosure is to provide a method and a hub apparatus for selecting a device to perform a service based on state information of the device, in response to a service request.

Another aspect of the present disclosure is to provide a method and a hub apparatus that provide a service using state information of a master device.

Another aspect of the present disclosure is to provide a method and a device that perform a service using operation information generated based on service identification information acquired through a tag.

In accordance with an aspect of the present disclosure, a method is provided for a hub apparatus to select a device. The method includes receiving a service request; determining a sensor based on the received service request; receiving state information from a device including the determined sensor; and selecting the device based on the received state information.

In accordance with another aspect of the present disclosure, a hub apparatus is provided, which includes a communicator configured to receive a service request; and a controller configured to determine a sensor based on the received service request, control the communicator to receive state information from a device including the determined sensor, and select the devices based on the received state information.

In accordance with another aspect of the present disclosure, a method is provided for a hub apparatus to control a device. The method includes receiving state information from a first device; determining a service to be performed based on the received state information; determining a sensor related to the determined service; selecting a second device including the determined sensor; requesting, from the selected second device, sensing information sensed by the determined sensor; receiving, from the selected second device, the sensing information in response to the requesting; and performing the determined service, based on the received sensing information.

BRIEF DESCRIPTION OF THE DRAWINGS

The above and/or other aspects, features, and advantages of certain embodiments of the present disclosure will be more apparent from the following description with reference to the accompanying drawings, in which:

FIG. 9 illustrates a method for providing an air conditioning service to a user using a service providing system according to an embodiment of the present disclosure;

FIG. 10 illustrates a method for providing an air conditioning service to a user using a service providing system according to an embodiment of the present disclosure;

DETAILED DESCRIPTION OF EMBODIMENTS OF THE DISCLOSURE

Various embodiments of the present disclosure will be described below with reference to the accompanying drawings. However, the present disclosure is not limited to these specific embodiments and should be construed as including modification, equivalent and/or alternative thereof.

In the following description, detailed descriptions of well-known functions or configurations will be omitted to avoid unnecessarily obscuring the subject matters of the present disclosure.

Herein, terms such as "first" and "second" may be used to distinguish various elements, but do not limit the corresponding elements. Singular forms are intended to include the plural forms, unless the context clearly indicates otherwise. In addition, the terms "comprise" and "include" indicate the presence of features, numbers, steps, operations, elements, parts, etc., but do not preclude the presence of one or more other features, numbers, steps, operations, elements, parts, etc.

In addition, a "module" or "unit" may perform one or more functions or operations, and may be implemented by using hardware or software or a combination of hardware and software. In addition, a plurality of "modules" or a plurality of "units" may be integrated into one or more modules, except for a "module" or "unit" implemented by specific hardware, and may be implemented as one or more processors.

Figure 1:
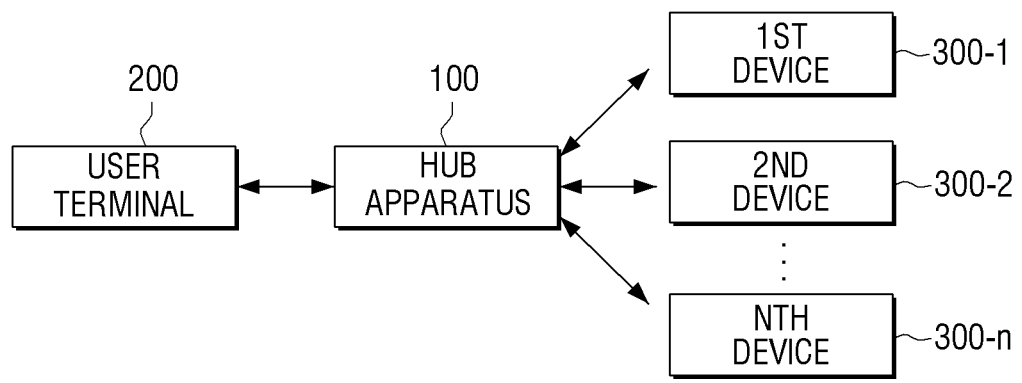
FIG. 1 illustrates a service providing system according to an embodiment of the present disclosure.

FIG. 1 illustrates a service providing system according to an embodiment of the present disclosure.

Referring to FIG. 1, the service providing system includes a hub apparatus 100, a user terminal 200, and a plurality of devices 300-1 to 300-*n*.

The service providing system may form a device group including one or more of the devices 300-1 to 300-*n*, through the hub apparatus 100, and provide various services requested by a user.

For example, the hub apparatus 100, which manages and controls the devices 300-1 to 300-*n* to perform a service as requested by the user, may be implemented by using a home gateway device. The hub apparatus 100 may also be implemented as a smart television (TV), a desktop personal computer (PC), a notebook PC, a home appliance (e.g., a refrigerator, an air conditioner, etc.), etc.

In addition, the devices 300-1 to 300-*n* may include a device that includes a sensor for acquiring sensing information for performing a specific service. In particular, the devices 300-1 to 300-*n* may include one or more sensors and are movable and attachable and detachable.

Herein, the "service" refers providing convenience to users by monitoring an environment and performing an operation of a specific device, and "performing the service" refers to providing an environment or multimedia as desired by the user by controlling, e.g., a home appliance. For example, the service may include an air conditioning service, a sleep service, a security service, a temperature management service, etc.

The hub apparatus 100 acquires service information through various sources. For example, the hub apparatus 100 may receive service information from an external server, from the user terminal 200, or from service information pre-stored therein at the time of manufacturing.

The hub apparatus 100 receives a service request from the external user terminal 200, from one of the devices 300-1 to 300-*n*, or directly from a user.

Thereafter, the hub apparatus 100 determines one or more sensors for performing a service in response to the service request, and receives state information from one or more of the devices 300-1 to 300-*n* including one or more sensors from among the determined sensors. In addition, the hub apparatus 100 may select one or more of the devices 300-1 to 300-*n* to perform the service based on the state information.

The hub apparatus 100 may form a device group with the selected one or more devices. Herein, the "device group" refers to a group of devices for performing the service.

The hub apparatus 100 compares the service requested by the user and pre-stored service information, in response to the service request being received, and determines sensors for performing the service based on a result of the comparison. The hub apparatus 100 may determine one or more of the devices 300-1 to 300-*n* including one or more sensors from among the determined sensors.

In addition, the hub apparatus 100 may request state information from the determined one or more of the devices 300-1 to 300-*n*, and receive the state information from the one or more of the devices 300-1 to 300-*n*.

In addition, the hub apparatus 100 may select one or more of the devices 300-1 to 300-*n* including sensors for performing the service based on the received state information. In this case, the state information may include the location of the devices 300-1 to 300-*n*, the battery information of the devices 300-1 to 300-*n*, the use history of the devices 300-1 to 300-*n*, etc. The state information may also include information received from the outside (weather information, etc.) or user information (user schedule information, user health information, user location information, etc.).

The state information may be transmitted from the devices 300-1 to 300-*n* in response to a request of the hub apparatus 100 or may be transmitted from the devices 300-1 to 300-*n* in response to an attachment location or mode of the devices 300-1 to 300-*n* being changed. In addition, the state information may be periodically transmitted according to according to user settings or a service type.

In particular, the hub apparatus 100 may determine one or more of the devices 300-1 to 300-*n* as devices to be included in the device group using the state information and the number of devices forming the device group.

In addition, in response to there being a device including a previously used sensor from among the sensors for performing the service, the hub apparatus 100 may select the device including the previously used sensor as a device to be included in the device group.

In addition, the hub apparatus 100 may transmit a signal for requesting sensing information from one or more of the devices 300-1 to 300-*n* included in the device group. The signal for requesting the sensing information may include a sensing condition including a sensing period, a sensing information transmitting condition, etc., which may be set by the hub apparatus 100 for each service. In addition, the hub apparatus 100 may set the sensing condition based on the information received from the outside, the user information, etc.

The one or more of the devices 300-1 to 300-*n* may acquire sensing information for the service using the sensor, based on the sensing condition included in the information for requesting the sensing information, and transmit the acquired sensing information to the hub apparatus 100.

In this case, the one or more of the devices 300-1 to 300-*n* may activate a sensor for acquiring the sensing information requested by the hub apparatus 100 from among the plurality of sensors included in the one or more of the devices 300-1 to 300-*n*, and inactivate the other sensors.

In addition, the hub apparatus 100 may perform the service based on the acquired sensing information. For example, the hub apparatus 100 may control an external device or provide a notification or information to the user based on the acquired sensing information.

By forming the device group according to the service and acquiring the sensing information as described above, the hub apparatus 100 may provide various services to the user using a limited number of devices.

Figure 2:
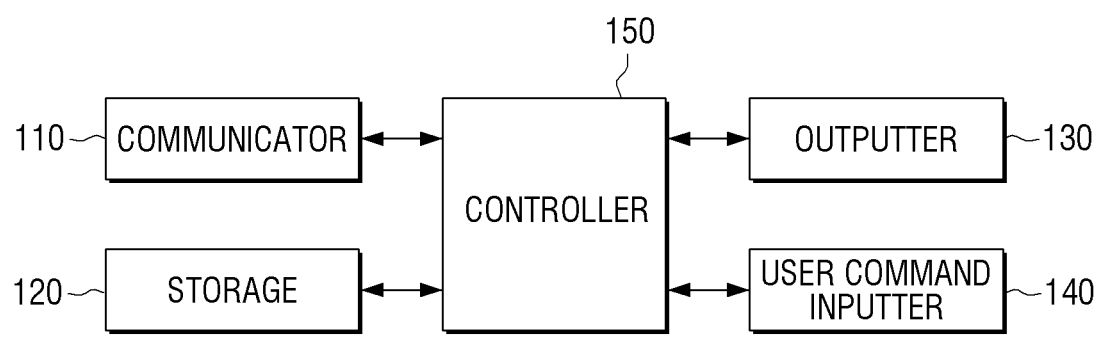
FIG. 2 illustrates a hub apparatus according to an embodiment of the present disclosure.

FIG. 2 illustrates a hub apparatus according to an embodiment of the present disclosure. For example, the hub apparatus 100 illustrated in FIG. 1 may be embodied as illustrated in FIG. 2.

Referring to FIG. 2, the hub apparatus includes a communicator 110, a storage 120, an outputter 130, a user command inputter 140, and a controller 150.

The communicator 110 may communicate with an external device. The communicator 110 may include various communication chips, such as a WiFi chip that communicates over a local area network (LAN), a Bluetooth chip that communicate using Bluetooth, a wireless communication chip, etc. When the WiFi chip or the Bluetooth chip is used, a variety of connection information such as a service set identifier (SSID), a session key, etc., may be exchanged, and communication may then be established using the connection information. Thereafter, a variety of information may be exchanged over the established communication link. The wireless communication chip may communicate according to various communication standards such as Institute of Electrical and Electronics Engineers (IEEE), Zigbee, $3^{rd}$ Generation (3G), $3^{rd}$ Generation Partnership Project (3GPP), Long Term Evolution (LTE), etc.

The communicator 110 may receive a service request from an external user terminal, e.g., the user terminal 200 illustrated in FIG. 1. The communicator 110 may receive information on a device and service information from the external user terminal with the service request.

The communicator 110 may transmit, to an external device, e.g., one or more of the devices 300-1 to 300-*n* illustrated in FIG. 1, a signal requesting sensing information. In addition, the communicator 110 may receive sensing information for performing the service from the external device.

The storage 120 stores a variety of information for providing the service to the user such as information on the external device, service information, user information, security information, etc.

The outputter 130 outputs a variety of information related to the service requested by the user. For example, the outputter 130 may be implemented as a display, a speaker, etc.

Figure 14A:
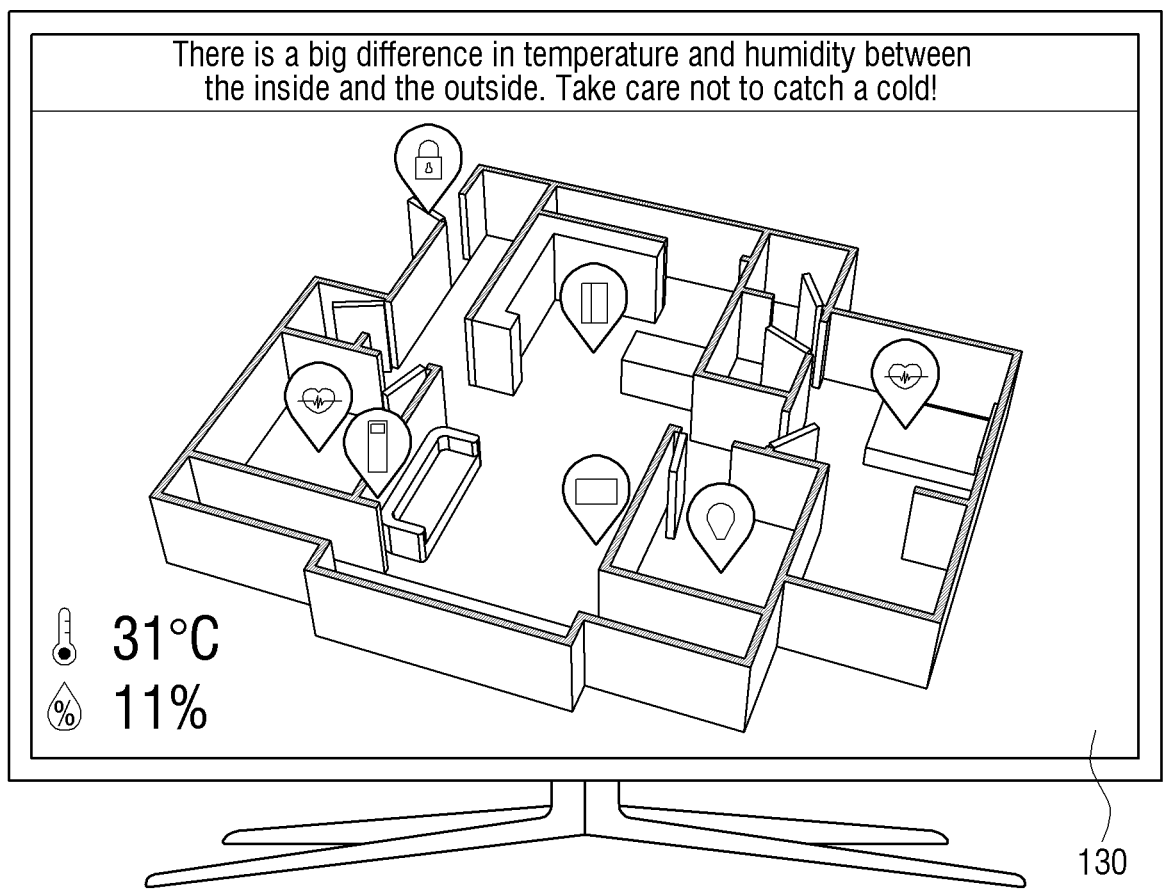
FIGS. 14A and 14B illustrate a device group user interface (UI) provided by a hub apparatus according to an embodiment of the present disclosure.
Figure 14B:
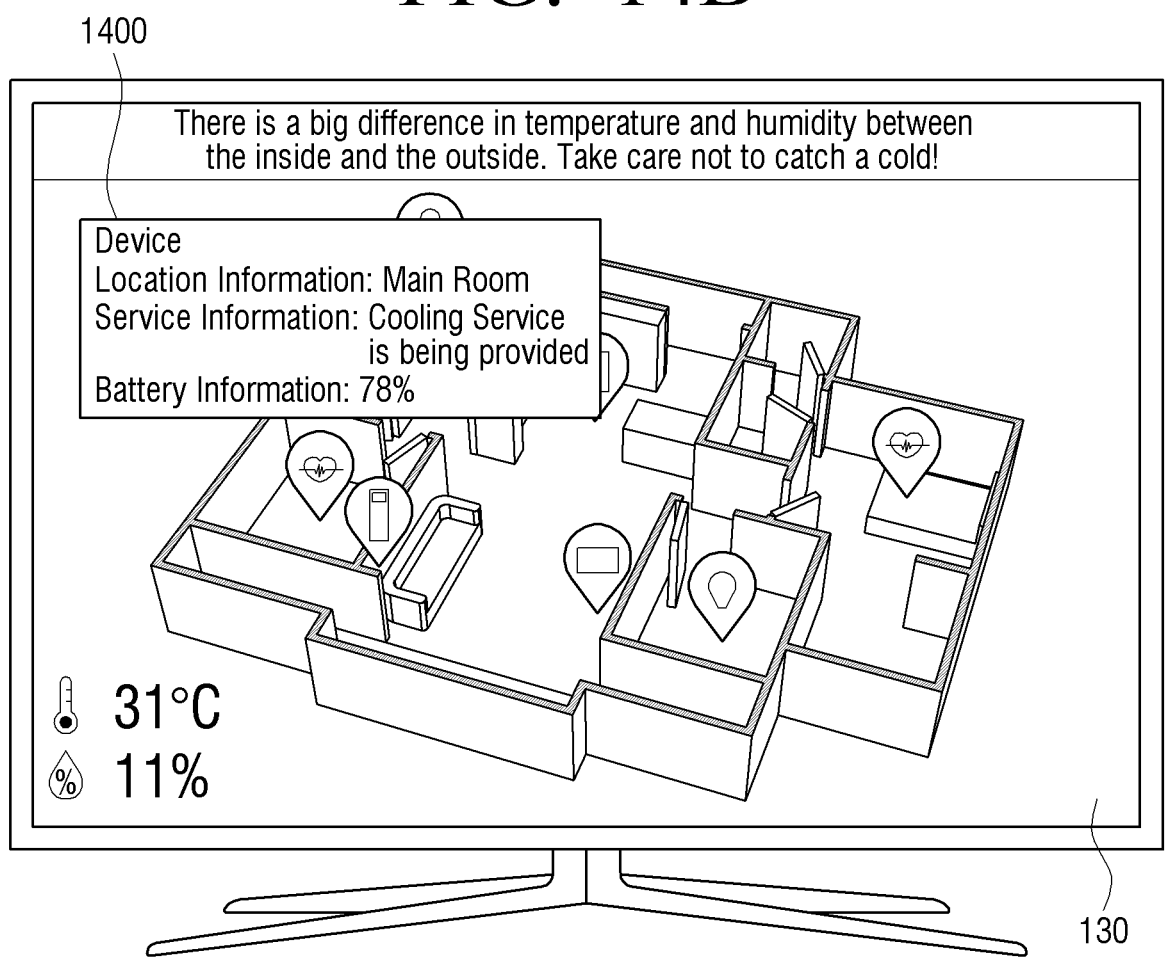

FIGS. 14A and 14B illustrate a device group UI provided by a hub apparatus according to an embodiment of the present disclosure.

Referring to FIG. 14A, the outputter 130, i.e., a television, displays a service UI indicating performance of the service currently requested by the user.

Referring to FIG. 14B, the outputter 130 also outputs a UI 1400 including location information, service information, and battery information of a device.

Referring again to FIG. 2, the user command inputter 140 may receive various user commands for controlling the hub apparatus. For example, the user command inputter 140 may receive a user command for requesting a service desired by the user. The user command inputter 140 may be implemented as a remote controller, a touch screen, a pointing device, a keyboard, a mouse, a voice recognition device, a motion recognition device, etc.

The controller 150 controls an overall operation of the hub apparatus. Accordingly, when a service request is received, the controller 150 may determine one or more sensors for performing the service in response to the service request, control the communicator 110 to receive state information from one or more devices including one or more sensors from among the determined sensors, and form a device group by selecting one or more devices, based on the state information.

The controller 150 may acquire a variety of information for performing the service prior to performing the service. For example, the controller 150 may acquire the information on the device, the service information, the user information, the security information, etc., from at least one of the external server and the user terminal.

In response to the service request being received from the outside, the controller 150 may determine the service to perform by comparing service identification information of the requested service and pre-stored service information, and determine one or more sensors for performing the determined service. For example, in response to a security service being requested, the controller 150 may determine a sensor (for example, an illuminance sensor, a motion sensor, etc.) for providing the security service based on the service request.

In addition, the controller 150 may determine one or more devices including one or more sensors from among the determined sensors. For example, the controller 150 may determine a first device and a second device, which include the illuminance sensor, and a third device, which includes the motion sensor.

In addition, the controller 150 may control the communicator 110 to receive state information from one or more devices. Herein, the state information may include at least one of the location of the device, the battery information of the device, and the use history of the device. The state information may be received according to a request of the hub apparatus. Alternatively, the state information may be automatically be transmitted to the hub apparatus at predetermined intervals and/or may be pre-stored in the hub apparatus.

The controller 150 may select one or more devices to perform the service based on the received state information. For example, the controller 150 may select a plurality of devices to be included in the device group using at least one of a number of devices forming the device group, a location of a device, battery information of a device, and use history of a device.

The controller 150 may determine one or more devices, such that the device group has a minimum number of devices for providing the service requested by the user. For example, when the controller 150 determines the sensors for providing the service requested by the user as a first sensor and a second sensor, the controller 150 may select a device including both the first sensor and the second sensor as a device to form the device group first. However, when there is not a single device including both the first sensor and the second sensor, the controller 150 may select a first device including the first sensor and a second device including the second sensor as devices to form the device group.

The controller 150 may select a device to form the device group, based on the location of the device. For example, the controller 150 may select a device to form the device group based on a distance between a person and the device, a distance between a thing and the device, a driving range of the device, etc., according to the purpose of the service.

In addition, the controller 150 may determine a device to form the device group based on the battery information of the device. That is, the controller 150 may preferentially select a device that can stably supplies power, e.g., with a higher battery level, to form the device group.

In addition, the controller 150 may select a device to form the device group based on the use history of the device. For example, when a user often uses a device, the battery of the used device discharges and the reliability of the device deteriorates. Therefore, in order to prevent only one device from continuously being used, the controller 150 may select a device for the device group, based on the use history of the device. That is, the controller 150 may exclude a device which has been used during a predetermined time from the device group, based on the use history of the device 300.

In addition, when a device includes a previously used sensor for performing the service, the controller 150 may select the device including the previously used sensor as a device to form the device group first. That is, because the storage 120 stores the sensing information detected by the previously used sensor, the controller 150 may first select the device including the previously used sensor as a device for the device group, in order to use the sensing information of the previously used sensor. In addition, because the storage 120 pre-stores the information of the device including the previously used sensor, the controller 150 may select the device including the previously used sensor for the device group, based on the information of the previously used device.

The controller 150 may form the device group as described above through a virtual node allocator (VNA).

The controller 150 may store information on a formed device group in the storage 120. Accordingly, when a subsequent request for the same service is received, the controller 150 does not have to form the device group again, but may request sensing information from one or more devices based on the device group previously stored in the storage 120.

However, if too much time has passed since a device group was formed and stored in the storage 120, the controller 150 may not request the sensing information using the pre-stored information on the device group and will re-form the device group again.

Similarly, in response to a request for a service being received after a device is newly added or removed (or after the location of the device is changed or a sensor is added/deleted), the controller 150 may not request the sensing information using the pre-stored information on the device group and may re-form the device group again.

In addition, a user may instruct the controller 150 not to request the sensing information using the pre-stored information, and to form a new device group.

After the device group is formed, the controller 150 may perform a pairing operation with the plurality of devices included in the device group, e.g., using the pre-stored information on the device, the user information, the security information, etc. However, the controller 150 may omit the pairing operation in response to the device included in the device group having been already paired.

The controller 150 may control the communicator 110 to transmit a signal for requesting sensing information to one or more devices. The controller 150 may add a sensing condition in the signal for requesting the sensing information. For example, the sensing condition may include a sensing period, a sensing start time, a sensing end time, a sensing information transmitting condition, etc. The controller 150 may acquire a sensing condition, which is pre-designated for each service, and control the communicator 110 to transmit the request signal including the acquired sensing condition to the device.

The controller 150 may set the sensing condition based on information received from various external sources (for example, Internet, etc.) or user information. For example, in response to weather information being received from the outside and the requested service being a temperature management service, the controller 150 may set a sensing period, a sensing information transmitting condition, etc., for performing the temperature management service, based on the weather information received from the outside.

In addition, the controller 150 may set the sensing condition based on the user information, such as user schedule information, user health information, and user location information. For example, in response to determining that the user is abroad, based on the user schedule information, the controller 150 may set the sensing period to be relatively long.

In addition, in response to determining that the user has a cold, based on the user health information, the controller 150 may set a temperature condition for transmitting the sensing information to be relatively high.

In response to determining that the user is within a predetermined location in the house, based on the user location information, the controller 150 may set a current time as a sensing start time.

In response to a device transmitting the sensing information, the controller 150 may perform the service requested by the user based on the received sensing information. For example, in response to the user requesting the temperature management service, the controller 150 may identify the current temperature of the house based on a sensing value transmitted from the temperature sensors, and control an external device (e.g., a boiler, an air conditioner, etc.) to set the house temperature to temperature desired by the user. In response to the user requesting a security service, the controller 140 may determine whether there is a person coming into the house based on a sensing value transmitted from a motion sensor, an illuminance sensor, etc. When there is a person coming into the house, the controller 140 may control the communicator 110 to transmit an indication to the user.

The controller 150 may determine a device to perform the service instead of the hub apparatus 100. For example, the controller 150 may control the communicator 110 to transmit a control command to a device, such that the device, rather than the hub apparatus 100, controls an external device.

The controller 150 may perform the service based on the information received from the outside and the user information, in addition to the sensing information transmitted from the device. For example, the controller 150 may control an external device to set the house temperature to the temperature set by the user, based on the weather information received from the outside. In addition, the controller 150 may perform the service based on the user schedule information, the user health information, the user location information, etc.

In addition, the controller 150 may control power on/off of the external device. Specifically, the controller 150 may turn on/off power of the external device based on the use state or the battery state of the external device. for example, when an external device is not being used or the battery level thereof is less than or equal to a predetermined value, the controller 150 may control the communicator 110 to transmit a control signal to turn off the device.

Figure 3:
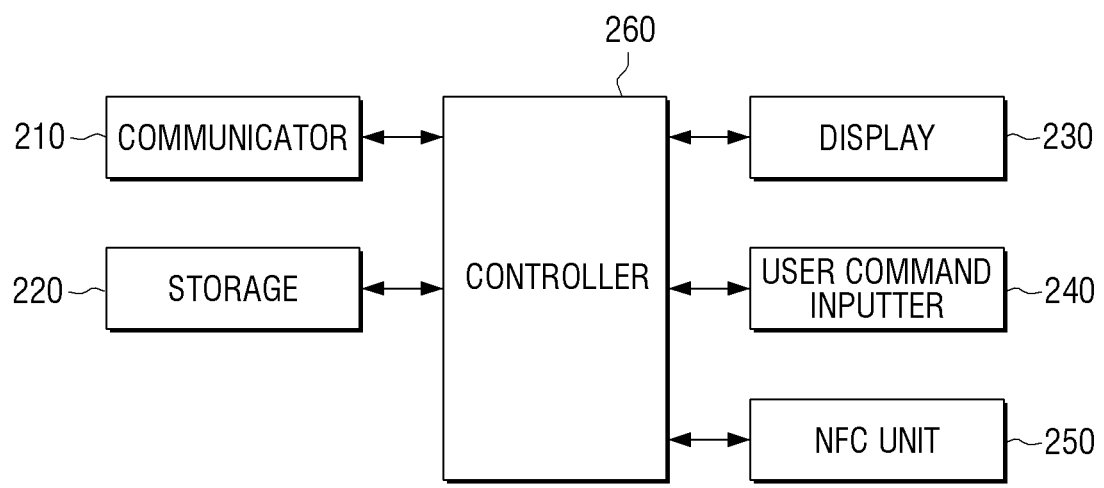
FIG. 3 illustrates a user terminal according to an embodiment of the present disclosure.

FIG. 3 illustrates a user terminal according to an embodiment of the present disclosure. For example, the user terminal 200 of FIG. 1 may be embodied as illustrated in FIG. 3.

Referring to FIG. 3, the user terminal, e.g., a smart phone, includes a communicator 210, a storage 220, a display 240, a user command inputter 240, a near field communication (NFC) unit 250, and a controller 260.

The communicator 210 may communicate with an external device. For example, the communicator 210 may communicate with a hub apparatus as illustrated in FIG. 2, using the above-described communication module. That is, the communicator 210 may communicate with the hub apparatus using short-distance wireless communication such as Bluetooth, Zigbee, etc., or using long-distance wireless communication such as WiFi or a wireless LAN.

The communicator 210 may transmit information on the device, service information, user information, etc., to the hub apparatus.

The storage 220 stores various data and programs for providing a service desired by the user. For example, the storage 220 may store user information, device information, service information, security information, etc.

The display 230 displays image data, e.g., a service selection UI for the user to select a service and service performance information transmitted from the hub apparatus.

The user command inputter 240 may receive various user commands for controlling the user terminal. For example, the user command inputter 240 may receive a user command for selecting a service desired by the user.

The user command inputter 240 may be implemented using a touch screen, a mouse, a keyboard, a voice recognition device, etc.

The NFC unit 250 may communicate with a device using an NFC chip. Specifically, the NFC chip operates in an NFC method using a band of 13.56 MHz from among various radio frequency identifier (RF-ID) frequency bands, such as 135 kHz, 13.56 MHz, 433 MHz, 860-960 MHz, 2.45 GHz, etc.

In response to the user terminal being tagged with the device, the NFC unit 250 may acquire information on the device, from the device. For example, tagging the user terminal with the device may refer to moving the user terminal to the device such that the user terminal is positioned within a predetermined distance (for example, distance where NFC communication is available) from the device. The information on the device may include identification information of the device (for example, an ID, MAC address information, etc.), sensor configuration information of the sensor included in the device, service detail information, etc.

In the above-described embodiment, the user terminal acquires information on a device through the NFC unit 250. However, this is merely an example and the user terminal may acquire the information on the device using other types of wireless communication such as Bluetooth.

The controller 260 controls an overall operation of the user terminal. For example, in response to the user terminal being tagged with a device, the controller 260 may acquire the information on the device through the NFC unit 250. In response to service identification information being received from the device, the controller 260 may request a service from the hub apparatus based on the service identification information. In addition, the controller 260 may control the communicator 210 to add the service identification information of the service requested by the user to a request signal, and transmit the signal.

In response to a service desired by the user being selected through the user command inputter 240, the controller 260 may generate a service request signal based on ID information of the device, the user information, the service identification information, etc., which are pre-stored, and control the communicator 210 to transmit the generated service request signal to the hub apparatus.

In response to a service list being distributed by the hub apparatus, the controller 260 may control the display 230 to display a UI including the distributed service list. In response to one service being selected using the UI including the service list, the controller 260 may control the communicator 210 to transmit a request signal including service identification information corresponding to the selected service to the hub apparatus.

In addition, the controller 260 may receive service performance information from the hub apparatus through the communicator 210. The controller 260 may control the display 230 to display the performance information.

Figure 4:
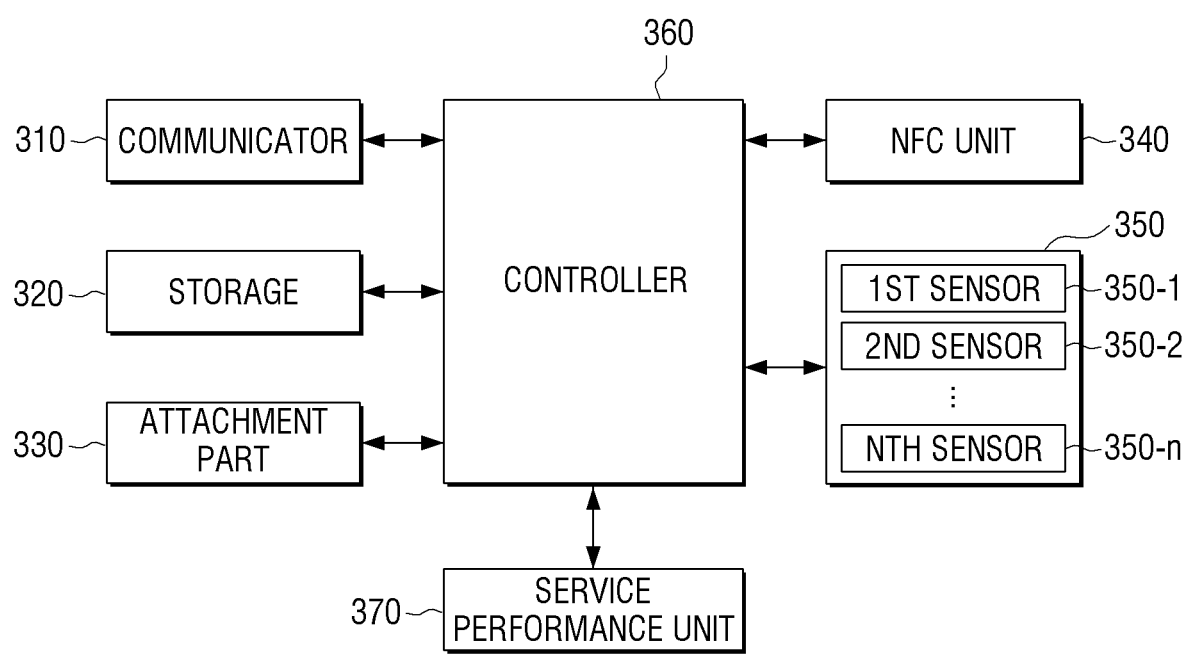
FIG. 4 illustrates a device according to an embodiment of the present disclosure.

FIG. 4 illustrates a device according to an embodiment of the present disclosure. For example, at least one of the devices 300-1 to 300-*n* of FIG. 1 may be embodied as illustrated in FIG. 4.

Referring to FIG. 4, the device, e.g., a movable patch type device, includes a communicator 310, a storage 320, an attachment part 330, an NFC unit 340, a sensing unit 350, and a controller 360. For example, the device may be attachable to or detachable from a device, a thing, a wall, a ceiling, etc.

The communicator 310 may communicate with an external device, e.g., the hub apparatus, using the above-described communication module. For example, the communicator 310 may communicate with the hub apparatus using short-distance wireless communication such as Bluetooth, Zigbee, etc., or may communicate with the hub apparatus 100 using long-distance wireless communication such as WiFi or a wireless LAN.

The communicator 310 may receive a signal for requesting sensing information from the hub apparatus, and transmit a signal including sensing information, in response.

In addition, the communicator 310 may establish communication with another device and exchange a variety of information (e.g., sensing information, control information, etc.) with another device.

The storage 320 may store a variety of information and programs for measuring a sensing value to provide a service to the user. For example, the storage 320 may store information on a device and service information.

The attachment part 330 is configured to be attachable to (and possibly detachable from) an external device, a thing, a wall, a ceiling, etc. In addition, the attachment part 330 may be attached to a tag, as will be described below.

The NFC unit 340 may communicate with a user terminal using an NFC chip. For example, in response to a user terminal being tagged with a device, the NFC unit 340 may provide information on the device to the user terminal.

In addition, the NFC unit 340 may include a first NFC unit to communicate with the user terminal, and a second NFC unit to communicate with the tag. In this case, a shielding structure may be provided between the first NFC unit and the second NFC unit to prevent interference in communication therebetween.

The sensing unit 350 includes a plurality of sensors 350-1 to 350-*n* that acquire various sensing values. The sensors 350-1 to 350-*n* may detect a physical quantity of heat, light, temperature, pressure, sound, etc., or a change therein, or identify and measure the physical quantity and inform of the same using a predetermined signal. Accordingly, the sensors 350-1 to 350-*n* may include various sensors, such as a temperature sensor to measure temperature, an illuminance sensor to measure an illuminance value, a motion sensor to measure a motion, a humidity sensor to measure humidity, a fine dust detection sensor to detect fine dust, an infrared (IR) sensor to exchange IR signals, etc.

The service performance unit 370 performs a service under control of the controller 360 or through a control command received from the hub apparatus. For example, the service performance unit 370 may directly open a window or close a refrigerator door using an actuator. In addition, the service performance unit 370 may be provided with an IR communication module to transmit a control command to an external device (e.g., a refrigerator, an air conditioner, etc.).

The controller 360 controls an overall operation of a device. For example, in response to receiving a signal requesting state information from the hub apparatus, the controller 360 may control the communicator 310 to transmit the state information of a current device (location information, battery information, use history information, etc.). In response to a signal for requesting sensing information being received from the hub apparatus, the controller 360 may determine a sensor to acquire sensing information based on information included in the request signal. For example, in response to a signal for requesting sensing information on temperature being received from the hub apparatus, the controller 360 may determine the temperature sensor as a sensor to measure the sensing information on the temperature.

The controller 360 may activate sensors corresponding to the sensing information requested by the hub apparatus, and deactivate other sensors. For example, when a device includes a temperature sensor and a motion sensor, and a request for temperature information is received from the hub apparatus, the controller 360 may activate the temperature sensor and deactivate the motion sensor. That is, the controller 360 may supply power to the temperature sensor, but not supply power to the motion sensor.

The controller 360 may measure a sensing value using a sensor that is determined based on a sensing condition included in the request signal. For example, the controller 360 may acquire sensing information based on a sensing period, a sensing start time, a sensing end time, a sensing information transmitting condition, etc., included in the request signal.

The controller 360 may control the communicator 310 to transmit the detected sensing information to the hub apparatus. The controller 360 may transmit the sensing value detected by the sensor to the hub apparatus.

The controller 360 may also generate a sensing result based on the sensing value and control the communicator 310 to transmit the sensing result to the hub apparatus. For example, in response to a temperature value detected by the temperature sensor being 15 degrees, and a value set by the user being 18 degrees, the controller 360 may control the communicator 310 to transmit the sensing value (i.e., 15 degrees) detected by the temperature sensor as is, or transmit sensing result information (i.e., information indicating that the temperature is lower than the temperature set by the user).

In addition, the controller 360 may control the service performance unit 370 to directly control an external device based on the sensing information. For example, the controller 360 may transmit a control command to operate an air conditioner to the air conditioner, and may close a refrigerator door to which the external device is attached using the actuator.

Figure 5:
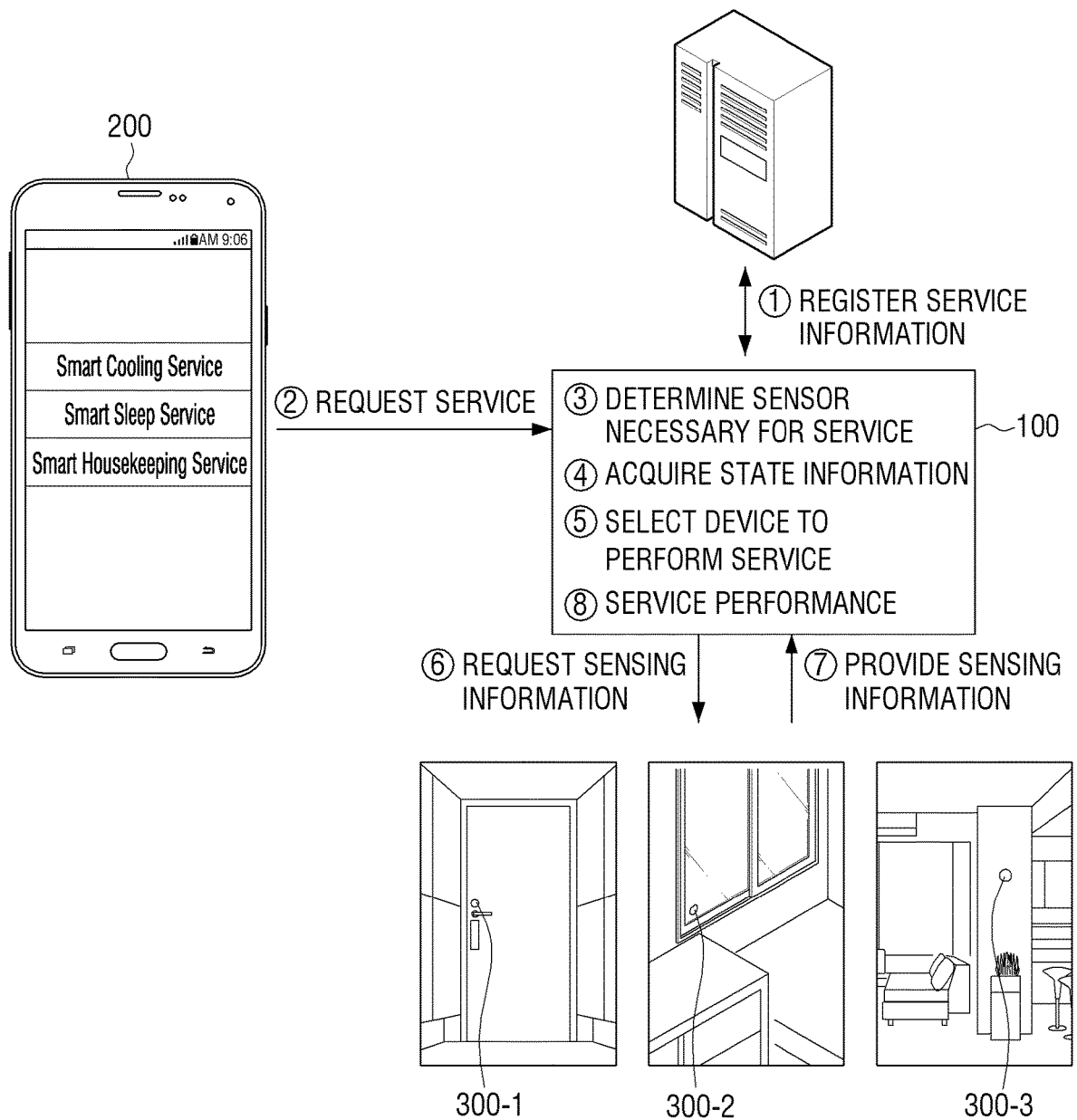
FIG. 5 illustrates a method for providing a service in a service providing system according to an embodiment of the present disclosure.

FIG. 5 illustrates a method for providing a service in a service providing system according to an embodiment of the present disclosure.

Referring to FIG. 5, in operation 1, the hub apparatus 100 registers service information from an external server. Specifically, the hub apparatus 100 acquires service information including identification information of services, sensors for performing the services, device information mapped onto the services, and service detail information. For example, the hub apparatus 100 may acquire service information as shown in Table 1 below.

TABLE 1

| Services | Service Identification Information | Sensors for performing services | Mapped Devices | Detailed Information |
|---|---|---|---|---|
| Air conditioning Service | 001 | Temperature, Humidity, Door opening detection, IR | 1st device, 2nd device, 3rd device | Control an air conditioning device by detecting indoor/outdoor temperature and a door opening state |
| Sleep Service | 002 | Temperature, Humidity, Fine dust, IR, Door opening detection, Illuminance | 1st device and 2nd device | Control an air conditioner, a humidifier, and illumination for a sound sleep by detecting temperature, humidity, illuminance |
| Security Service | 003 | Door opening detection, Illuminance, IR | 1st device and 3rd device | Detect intrusion from the outside based on a change in door opening or illuminance |

The service identification information, the sensors for performing the service, the mapped device information, and the detailed information included in the service information, as described above, are merely an example. Other information may also or alternatively be included and at least one piece of the above-described information may be omitted.

In FIG. 5, the service information is received from an external server. However, this is merely an example, and the service information may be received from other external devices (e.g., the user terminal 200, etc.).

The hub apparatus 100 may acquire information on the device and user information addition to the service information, and store the information. In this case, the hub apparatus 100 may acquire the information on the device, the user information, etc., from the user terminal 200.

The information on the device, the service information, and the user information may be implemented by using a json file format as shown in Table 2 below.

TABLE 2

| Information on the device | { "type" : "device ", "info" : { "device_id" : "device ID" "protocol" : "protocol name" "mac" : "MAC address" } "context: { "mode":"operation mode" "location": "location information" "power":"power value" "active":["sensor","sensor"] "inactive" :["sensor","sensor"] } } | { "type" : "001", "info" : { "device_id" : "aaa00111" "protocol" : "001" "mac" : "0112131311" } "context: { "mode":"sleep mode" "location":"main room" "power":"on" "active":["temperature","humidity] "inactive":["acceleration","IR"] } } |
|---|---|---|
| Service information | { "type" : "service ", "info" : { "service_id" : "service ID" "mapping_node" : ["",] } } | { "type" : "003", "info" : { "service_id" : "aaa0011" "mapping_node" : ["aaa00111", "aaa01110"] } } |
| User information | { "type" : "user", "info" : { "user_id" : "user ID" "service_list" : "subscription service list" } } | { "type" : "002", "info" : { "user_id" : "0182131" "service_list" : ["aaa0011", "bbb0022"] } } |

As shown in Table 2, the user information may be mapped onto the service information, and the service information may be mapped onto the device information. That is, the user information, the service information, and the device information may form a hierarchical structure. In addition, the service information, the information on the device, and the user information, as described above, may be updated through an external server or the user terminal 200.

The hub apparatus 100 may acquire security information (e.g., a password) to enhance communication security in communicating with a device. For example, the hub apparatus 100 may acquire security information from the user terminal 200 or the external server. In addition, the hub apparatus 100 may perform pairing with a device using the acquired security information.

In operation 2, the user terminal 200 requests a service from the hub apparatus 100. Specifically, the user terminal 200 displays a service list including a plurality of services, and in response to one of the displayed services being selected from the service list, the user terminal 200 transmits a request signal including service identification information corresponding to the selected service to the hub apparatus 100. For example, in response a "smart cooling service" being selected by the user, the user terminal 200 may transmit a request signal including service identification information "service ID: 0001" corresponding to the smart cooling service to the hub apparatus 100.

The hub apparatus 100 forms a device group including one or more devices for performing the requested service, i.e., the smart cooling service. Specifically, in operation 3, the hub apparatus 100 compares the service identification information included in the request signal and the pre-stored service information, and determines sensors and devices for the service. That is, in response to "service ID: 0001" being included in the request signal, the hub apparatus 100 determines that the service requested by the user is an air conditioning service using the pre-stored service information as shown in Table 1. In addition, the hub apparatus 100 determines sensors for the air conditioning service (e.g., a temperature sensor, a humidity sensor, a door opening detection sensor, an IR sensor, etc.). In addition, the hub apparatus 100 may determine devices that are mapped onto the air conditioning service.

In operation 4, the hub apparatus 100 acquires state information for the determined sensors.

In operation 5, the hub apparatus 100 selects one or more of the determined devices to form the device group, based on the state information of the device as described above.

The hub apparatus 100 may select one or more devices to be included in the device group using at least one of a number of devices forming the device group, a location of a device, battery information of a device, and a use history of a device.

After the device group is formed, in operation 6, the hub apparatus 100 requests sensing information from a plurality of devices 300-1, 300-2, and 300-3 included in the device group. For example, the hub apparatus 100 transmits a request signal including a sensing condition for acquiring sensing information to the plurality of devices 300-1, 300-2, and 300-3.

In response to the sensing information request signal, the plurality of devices 300-1, 300-2, and 300-3 acquire sensing information. For example, the plurality of devices 300-1, 300-2, and 300-3 may acquire the sensing information based on the sensing condition included in the sensing information request signal.

In operation 7, the plurality of devices 300-1, 300-2, and 300-3 provide the acquired sensing information to the hub apparatus 100.

In operation 8, the hub apparatus 100 performs the service requested by the user, based on the acquired sensing information. For example, in response to the service requested by the user being the air conditioning service, the hub apparatus 100 may control an air conditioner or close a door, based on the received sensing information (e.g., temperature information, humidity information, door opening information, etc.).

In FIG. 5, the hub apparatus 100 performs the service. However, this is merely an example and the device devices 300-1, 300-2, and 300-3 may directly perform the service. For example, in response to the device 300-1 being provided with an actuator, the device devices 300-1 may open or close the door according to a result of sensing using the service performance unit 370. In addition, the device 300-3 may directly transmit a control signal to the air conditioner.

Figure 6:
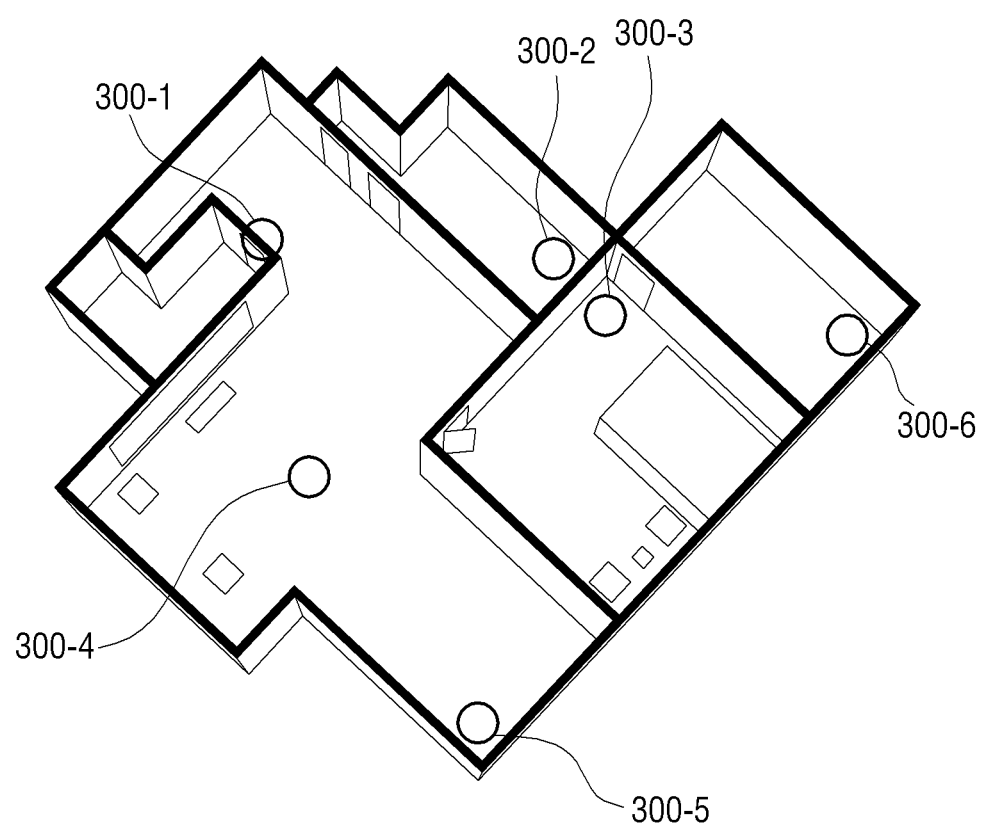
FIG. 6 illustrates a distribution of devices in a service providing system according to an embodiment of the present disclosure.

FIG. 6 illustrates a distribution of devices in a service providing system according to an embodiment of the present disclosure.

Referring to FIG. 6, six devices 300-1 to 300-6 are provided in a house. Specifically, the first, fourth, and fifth devices 300-1, 300-4, and 300-5 are provided in a living room, the second device 300-2 is provided in a veranda, the third device 300-3 is provided in a bedroom, and the sixth device 300-6 is provided in a bathroom. In addition, each of the devices 300-1 to 300-6 may include a plurality of sensors as illustrated in FIG. 7.

Figure 7:
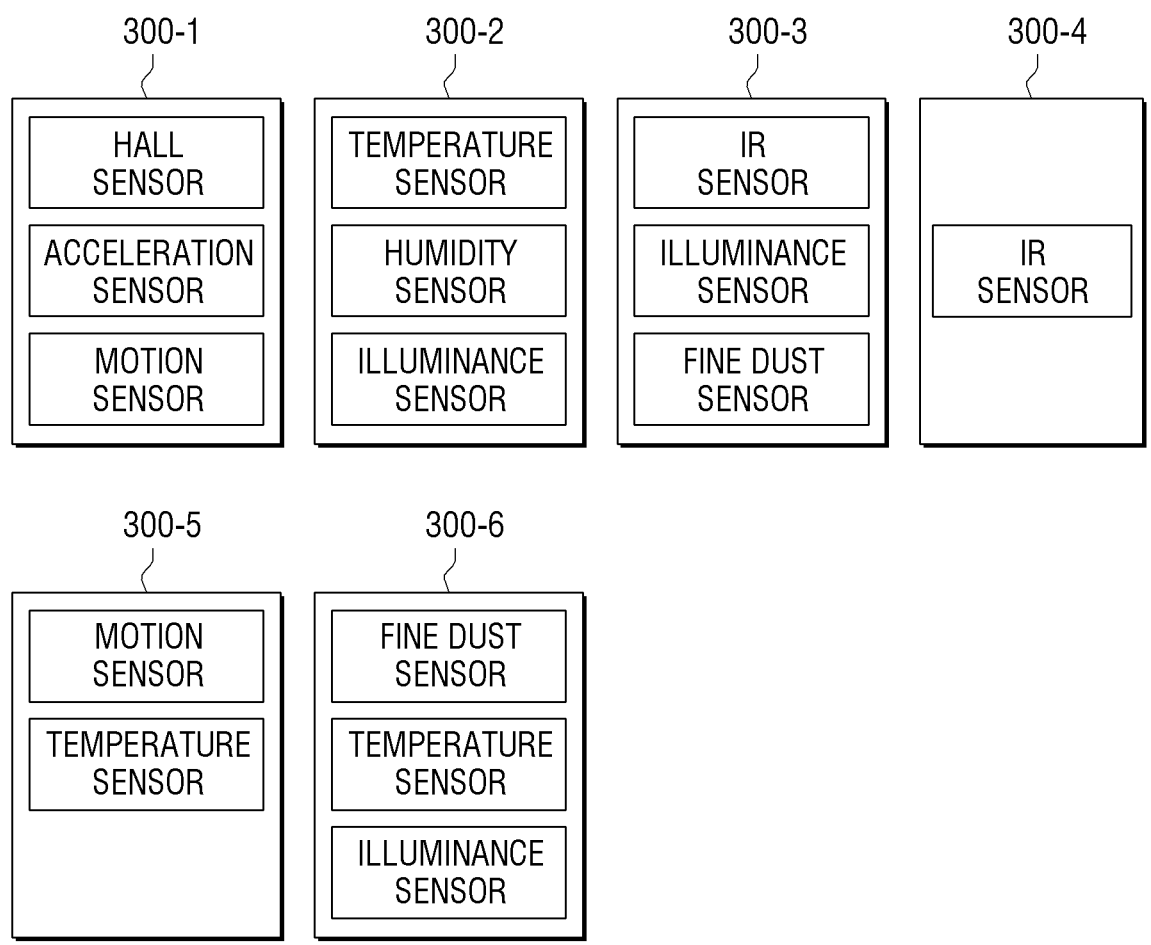
FIG. 7 illustrates sensor structures of devices in a service providing system according to an embodiment of the present disclosure.

FIG. 7 illustrates sensor structures of devices in a service providing system according to an embodiment of the present disclosure.

Referring to FIG. 7, the first device 300-1 includes a hall sensor, an acceleration sensor, and a motion sensor, the second device 300-2 includes a temperature sensor, a humidity sensor, and an illuminance sensor, the third device 300-3 includes an IR sensor, an illuminance sensor, and a fine dust sensor, the fourth device 300-4 includes an IR sensor, the fifth device 300-5 includes a motion sensor and a temperature sensor, and the sixth sensor 300-6 includes a fine dust sensor, a temperature sensor, and an illuminance sensor.

Figure 8:
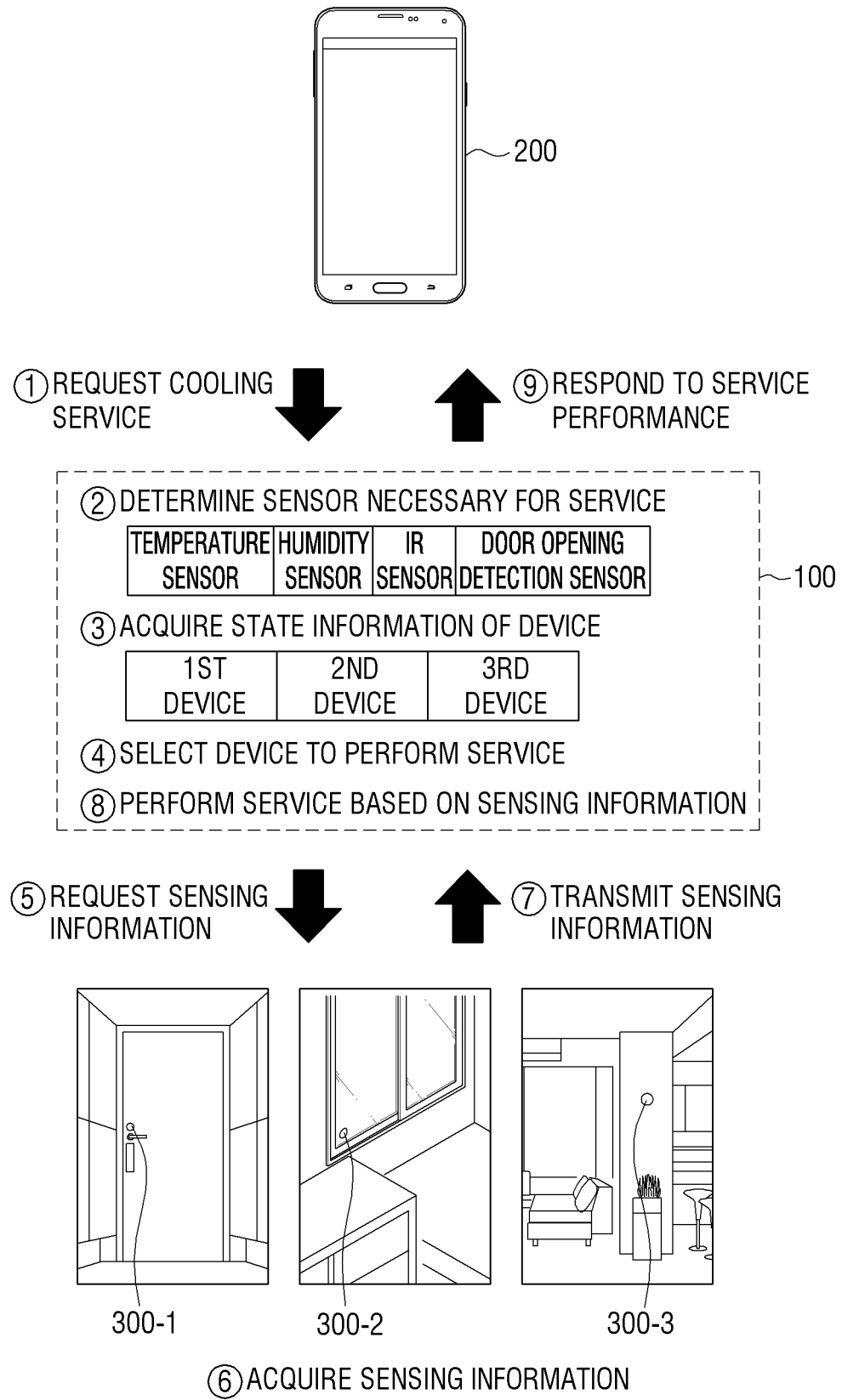
FIG. 8 illustrates a method for providing an air conditioning service to a user using a service providing system according to an embodiment of the present disclosure.

FIG. 8 illustrates a method for providing an air conditioning service to a user using a service providing system according to an embodiment of the present disclosure.

Referring to FIG. 8, in operation 1, the user terminal 200 requests the air conditioning (or cooling) service from the hub apparatus 100. The request signal may include service identification information of the air conditioning service.

In operation 2, the hub apparatus 100 determines sensors for the air conditioning service, in response to the request received from the user terminal 200. The hub apparatus 100 compares the service identification information included in the request signal and pre-stored service information, and determines "a temperature sensor, a humidity sensor, an IR sensor, and a door opening detection sensor" as the sensors for the air conditioning service.

In addition, the hub apparatus 100 determines devices including the temperature sensor, the humidity sensor, the IR sensor, and the door opening detection sensor.

In operation 3, the hub apparatus 100 acquires state information of the devices.

In operation 4, the hub apparatus 100 determines devices to form a device group from among the devices including the temperature sensor, the humidity sensor, the IR sensor, and the door opening detection sensor. Specifically, the hub apparatus 100 may determine devices to form the device group using at least one of the number of devices forming the device group, and the acquired state information of the device (e.g., location of the device, battery information of the device, use history of the device, etc.).

In FIG. 8, the hub apparatus 100 determines a first device 300-1 as a device provided with the door opening detection sensor, a second device 300-2 as a device provided with the temperature sensor and the humidity sensor, and a third device 300-3 as a device provided with the IR sensor. Accordingly, the hub apparatus 100 selects the first device 300-1, the second device 300-2, and the third device 300-3 to perform the air conditioning service, and forms the device group with the selected first to third devices 300-1 to 300-3.

In operation 5, the hub apparatus 100 requests sensing information from the first device 300-1, the second device 300-2, and the third device 300-3.

In operation 6, the first device 300-1, the second device 300-2, and the third device 300-3, which form the device group to perform the air conditioning service, detect sensing information (e.g., temperature information, humidity information, door opening detection information, etc.) for performing the air conditioning service, and in operation 7, deliver the detected sensing information to the hub apparatus 100.

In operation 8, the hub apparatus 100 performs the air conditioning service, as requested by the user, based on the delivered sensing information, and in operation 9, transmits a response to the service request to the user terminal 200. Specifically, the hub apparatus 100 determines current temperature based on the sensed sensing information and compares the current temperature and temperature requested by the user. When the current temperature is higher than the temperature requested by the user, the hub apparatus 100 may close the door and operate the air conditioner. In addition, the hub apparatus 100 may deliver the current temperature information and the result of controlling to the user terminal 200, and the user terminal 200 may display the current temperature information and the result of the controlling.

FIG. 9 illustrates a method for providing an air conditioning service to a user using a service providing system according to an embodiment of the present disclosure.

Referring to FIG. 9, in operation 1, the user terminal 200 requests the air conditioning service from the hub apparatus 100.

In operation 2, the hub apparatus 100 determines sensors for the service in response to the service request. Specifically, the hub apparatus 100 compares service identification information included in the request signal received from the user terminal 200 and pre-stored service information, and determines "a temperature sensor, a humidity sensor, an IR sensor, and a door opening detection sensor" as sensors for the air conditioning service.

In operation 3, the hub apparatus 100 selects devices to be included in a device group based on whether a sensor used in an existing service is provided or not, and at least one of the number of devices forming the device group and state information of the device as described above. For example, when the third device 300-3 including the IR sensor is provided by an existing service, the hub apparatus 100 may determine the first device 300-1 as a device provided with the door opening detection sensor, the second device 300-2 as a device provided with the temperature sensor and the humidity sensor, and the third device 300-3 as a device provided with the IR sensor. Accordingly, the hub apparatus 100 selects the first device 300-1, the second device 300-2, and the third device 300-3 to perform a temperature management service, and forms the device group with the selected first to third devices 300-1 to 300-3.

In operation 4, the hub apparatus 100 requests the first device 300-1, the second device 300-2, and the third device 300-3 to form the device group. The request signal for forming the device group, which is transmitted by the hub apparatus 100, may include a request for sensing information.

In operation 5, the first device 300-1, the second device 300-2, and the third device 300-3, which form the device group to perform the air conditioning service, detect sensing information to perform the air conditioning service, and in operation 6, deliver the sensing information to the hub apparatus 100.

In operation 7, the hub apparatus 100 performs the air conditioning service, as requested by the user, based on the delivered sensing information, and in operation 8, transmits a response to the service request to the user terminal 200.

FIG. 10 illustrates a method for providing an air conditioning service to a user using a service providing system according to an embodiment of the present disclosure.

Referring to FIG. 10, in operation 1, the user terminal 200 requests the air conditioning service from the hub apparatus 100.

In operation 2, the hub apparatus 100 determines sensors for the service in response to the service request. That is, the hub apparatus 100 determines a door opening detection sensor, a temperature sensor, a humidity sensor, and an IR sensor as sensors for performing the air conditioning service.

In FIG. 10, the hub apparatus 100 determines devices including the door opening detection sensor, the temperature sensor, the humidity sensor, and the IR sensor. The hub apparatus 100 may determine the devices based on whether there is pre-stored sensing information or not, in addition to at least one of the number of devices forming a device group and state information of the device as described above.

For example, in response to sensing information measured by the IR sensor being pre-stored, the hub apparatus 100 may determine the first device 300-1 as a device provided with the door opening detection sensor and the second device 300-2 as a device provided with the temperature sensor and the humidity sensor to determine devices for performing the air conditioning service, but may not separately determine a device provided with the IR sensor. Accordingly, in operation 3, the hub apparatus 100 selects the first device 300-1 and the second device 300-2 to perform the temperature management service, and form the device group.

In operation 4, the hub apparatus 100 requests the first device 300-1 and the second device 300-2 to form the device group. The request signal for forming the device group, which is transmitted by the hub apparatus 100, may include a request for sensing information.

In operation 5, the first device 300-1 and the second device 300-2 form the device group to perform the air conditioning service, and detect sensing information to perform the air conditioning service. In operation 6, the first device 300-1 and the second device 300-2 deliver the sensing information to the hub apparatus 100.

In operation 7, the hub apparatus 100 performs the air conditioning service, as requested by the user, based on the delivered sensing information and the pre-stored sensing information, and in operation 8, transmits a response to the service request to the user terminal 200.

Figure 11:
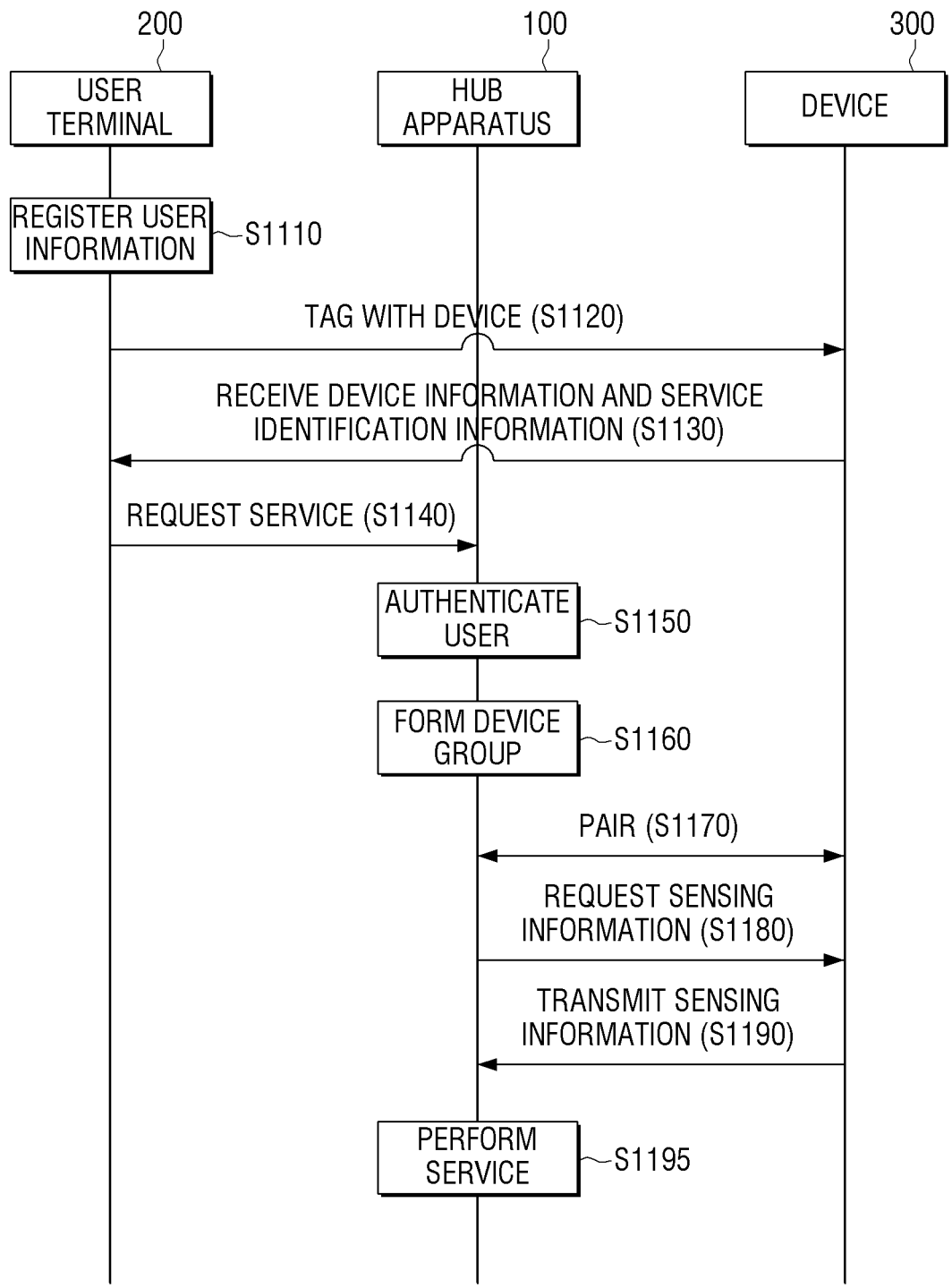
FIGS. 11 to 13 are signal flow diagrams illustrating methods for providing a service in a service providing system according to various embodiments of the present disclosure.

FIG. 11 is a signal flow diagram illustrating a method for providing a service in a service providing system according to an embodiment of the present disclosure.

Referring to FIG. 11, in step S1110, the user terminal 200 registers user information, such as a user ID, a password, a user name, a user age, etc.

In step S1120, the user terminal 200 is tagged with the device 300 by user manipulation.

In response to the user terminal 200 being tagged with the device 300, the user terminal 200 receives device information and service information in step S1130.

In step S1140, the user terminal 200 requests a service from the hub apparatus 100 according to a user command. For example, the user terminal 200 may transmit a service request including service identification information of the service requested by the user, and user information.

In response, the hub apparatus 100 authenticates the user based on the user information in step S1150.

In step S1160, the hub apparatus 100 forms a device group corresponding to the requested service. For example, the hub apparatus 100 may determine sensors for performing the requested service based on the service identification information, and may select one or more devices including the determined sensors, based on the state information of the device, in order to form the device group.

In step S1170, the hub apparatus 100 performs pairing with the device 300. For example, the hub apparatus 100 may perform pairing with the device 300 using pre-stored information of the device (e.g., ID information of the device, MAC address information of the device, etc.). However, if the hub apparatus 100 and the device 300 are already paired with each other, step S1170 may be omitted.

In step S1180, the hub apparatus 100 requests sensing information from the device 300. A signal for requesting the sensing information may include a sensing condition, such as a type of a sensor for detecting the sensing information, a sensing period, a sending start time, a sensing end time, a sensing information transmitting condition, etc.

In step S1190, the device 300 detects sensing information in response to the request, and transmits the detected sensing information to the hub apparatus 100.

In step S1195, the hub apparatus 100 performs the service using the sensing information received from the device 300.

Figure 12:
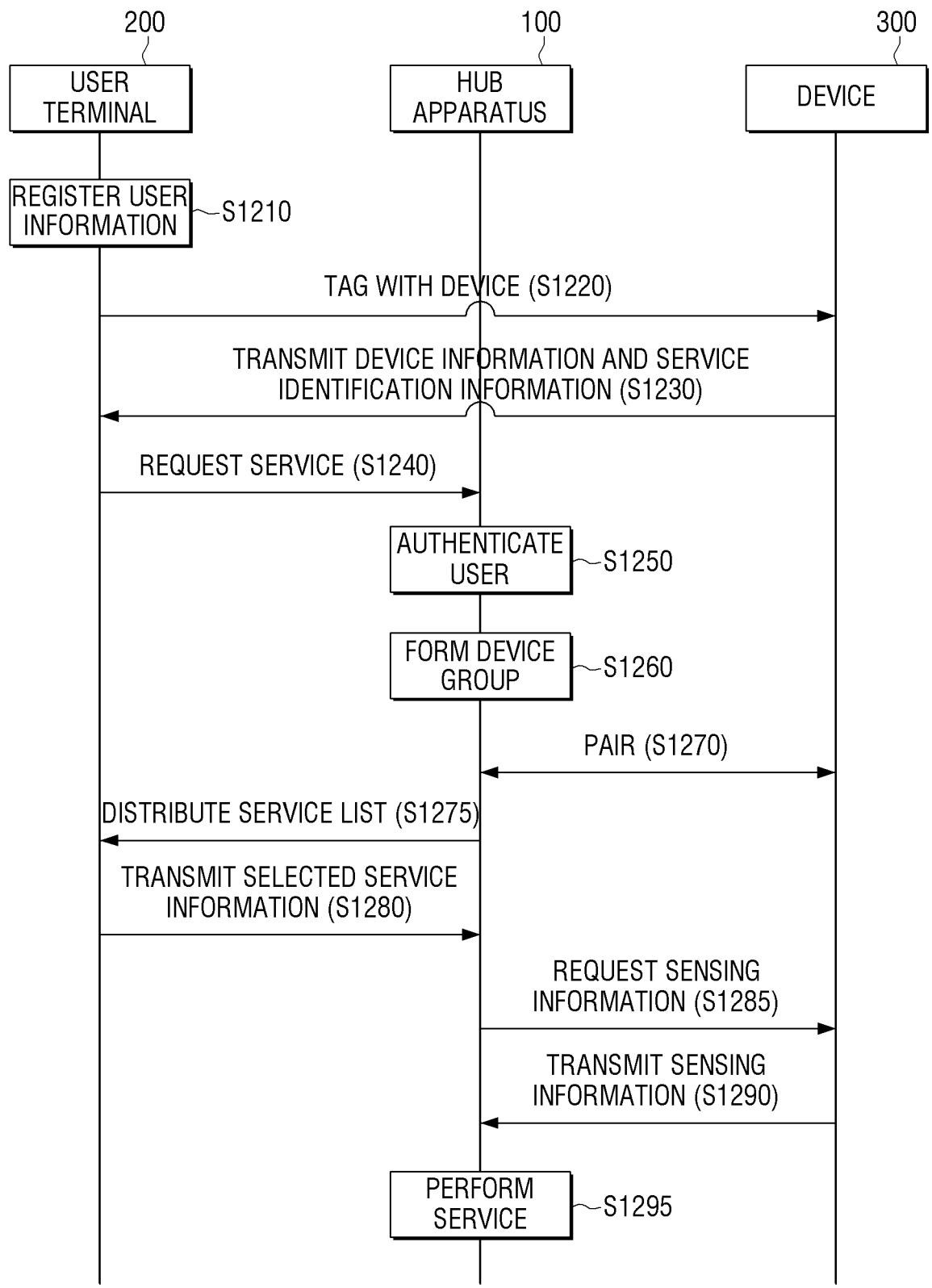

FIG. 12 is a signal flow diagram illustrating a method for providing a service in a service providing system according to an embodiment of the present disclosure.

Referring to FIG. 12, steps S1210 to S1270 are the same as steps S1110 to S1170, as described above.

In step S1275, the hub apparatus 100 distributes a service list related to the service requested by the user to the user terminal 200. The service list may be generated using pre-stored service information. For example, in response to the service requested by the user being a temperature setting service, the service list may include services related to the service requested by the user, such as a main room temperature setting service, a living room setting service, a kid room temperature setting service, etc.

In step S1280, in response to one service being selected from the received service list, the user terminal 200 transmits information on the selected service (e.g., service identification information corresponding to the selected service) to the hub apparatus 100.

In step S1285, the hub apparatus 100 requests sensing information from the device 300.

In step S1290, the device 300 detects sensing information in response to the request, and transmits the detected sensing information to the hub apparatus 100.

In step S1295, the hub apparatus 100 performs the service using the sensing information received from the device 300.

Figure 13:
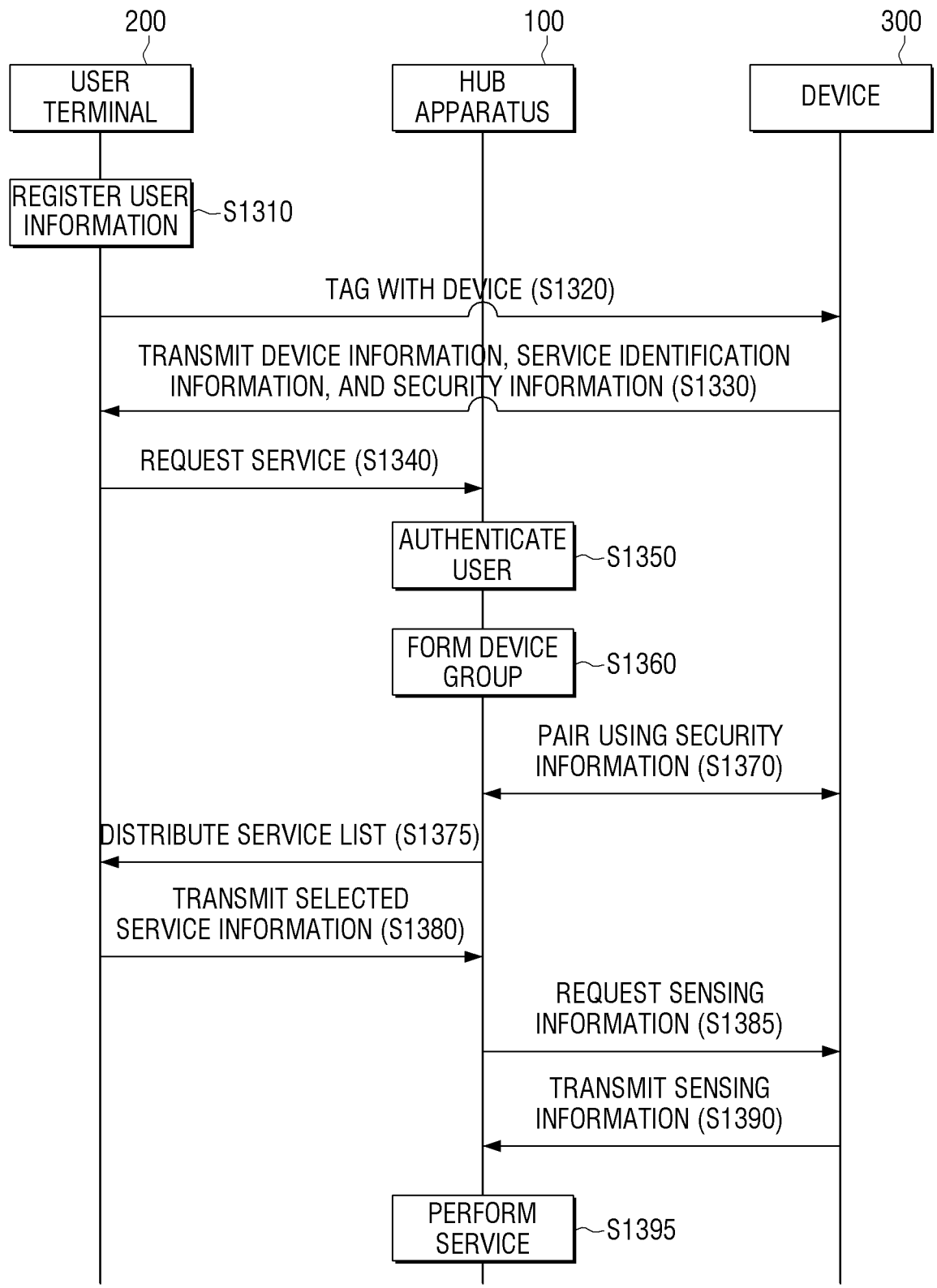

FIG. 13 is a signal flow diagram illustrating a method for providing a service in a service providing system according to an embodiment of the present disclosure.

Referring to FIG. 13, in step S1301, the user terminal 200 registers user information, and in step S1320, the user terminal 200 is tagged with the device 300 by user manipulation.

In response to the user terminal 200 being tagged with the device 300, the user terminal 200 transmits device information, service information, and security information (e.g., a security key) in step S1330.

In step S1340, the user terminal 200 requests a service from the hub apparatus 100 according to a user command. In this case, the user terminal 200 may transmit a service request including user information, service identification information corresponding to the selected service, and security information.

In step S1350, the hub apparatus 100 authenticates the user based on the user information.

In step S1360, the hub apparatus 100 forms a device group corresponding to the requested service.

In step S1370, the hub apparatus 100 performs pairing with the device 300 using the security information and information on the device, in order to increase security. However, if the hub apparatus 100 and the device 300 are already paired with each other, step S1370 may be omitted.

Step S1375 to S1395 are the same as steps S1275 to S1295, as described above.

Figure 15:
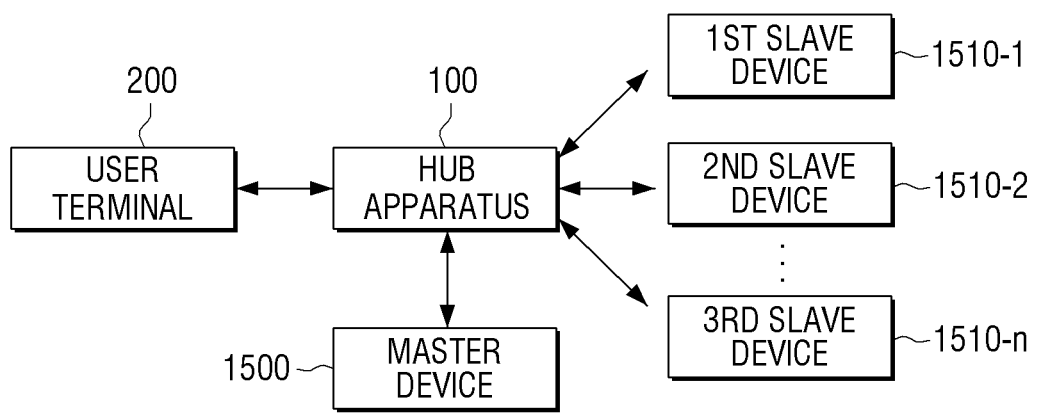
FIG. 15 illustrates a service providing system including a master device according to an embodiment of the present disclosure.

FIG. 15 illustrates a service providing system including a master device according to an embodiment of the present disclosure.

Referring to FIG. 15, the service providing system includes a hub apparatus 100, a user terminal 200, a plurality of slave devices 1510-1 to 1510-n, and a master device 1500. The hub apparatus 100 and the user terminal 200, are described above with reference to in FIGS. 1 to 4, and the plurality of slave devices 1510-1 to 1510-n are similarly implemented as the plurality of devices 300-1 to 300-n; thus, a redundant explanation is omitted.

The master device 1500, which is a device for transmitting information on a service desired by the user to the hub apparatus 100, may transmit the service desired by the user to the hub apparatus 100 according to state information (e.g., mode information or location information) of the master device 1500.

The slave devices 1510-1 to 1510-n perform services according to a service type based on the state information of the master device 1500. In addition, the master device 1500 may be a kind of device, but may be operated as a master device according to user's settings. For example, the master device 1500 may include a separate hardware structure (a button, a dial, a switch, etc.) unlike a normal device.

The master device 1500 may inform the hub apparatus 100 that it serves as the master device in a method of manipulating the hardware structure, in a method of tagging with the slave device 1510, or in a method of attaching to a specific location by the user. In addition, the master device 1500 and the slave devices 1510-1 to 1510-n may be the same type of device, but are not limited thereto. In addition, the master device 1500 may be designated by user selection and may be designated according to capability thereof.

The service providing system of FIG. 15 may provide a different service to the user based on the state information (e.g., mode information or location information) of the master device 1500.

Specifically, the hub apparatus 100 receives the state information of the master device 1500. The state information refers to, but not limited to, a mode change, a location change, etc., of the master device 1500. The hub apparatus 100 defines a sensor for a service based on the state information of the master device 1500. For example, the hub apparatus 100 may determine a changed mode or location of the master device 1500, and determine a service desired by the user.

The state information of the master device 1500 may be transmitted to the hub apparatus 100, and the hub apparatus 100 may determine a service to perform according to the state information. For example, in response to the master device 1500 being attached to an air conditioner of a living room, one or more devices related to a temperature management service operate as the slave device 1510. However, if the master device 1500 is moved and attached to a front door when the user goes outside, attachment location information, which is one piece of the state information of the master device 1500, may be transmitted to the hub apparatus 100. For example, the hub apparatus 100 may then determine a security service as a service to perform, based on the new received attachment location information, and re-designate a device including a door opening detection sensor and an IR sensor as the slave devices 1510-1 to 1510-n by considering a sensor type for the security service and the state information.

According to locations or modes of the master device 1500, services, sensors, and slave devices are provided as shown in Table 3 below:

TABLE 3

| State information of the master device | Services to be performed | Sensors for performing the service | Slave devices including the sensors |
| --- | --- | --- | --- |
| Location Air Conditioner of a living Room | Mode Temperature management mode | Air conditioning service | Temperature and humidity | A device B device |
| Bed in a bed room | Sleep mode | Sleep service | Temperature, humidity, and illuminance | A device B device C device |
| Front door | Security mode | Security service | Door opening detection, IR | A device C device |

When it is determined that the master device 1500 is in a first mode based on operation information of the master device 1500, the hub apparatus 100 may determine one or more sensors to perform a first service corresponding to the first mode. However, when it is determined that the master device 1500 is in a second mode based operation information of the master device 1500, the hub apparatus 100 may determine one or more sensors to perform a second service corresponding to the second mode.

Alternatively, in response determining that the master device 1500 is on a first location through based on information of the master device 1500, the hub apparatus 100 may determine one or more sensors to perform a third service corresponding to the first location. In response to determining that the master device 1500 is on a second location based on operation information of the master device 1500, the hub apparatus 100 may determine one or more sensors to perform a second service corresponding to the second location. The hub apparatus 100 may detect the location movement of the master device 1500 using a beacon signal.

In addition, as described above, the hub apparatus 100 may designate one or more of the slave devices 1510-1 to 1510-n to include one or more sensors to perform a service corresponding to the operation of the master device 1500. In this case, the one or more of the slave devices 1510-1 to 1510-n designated to perform the service may include the master device 1500.

In addition, the hub apparatus 100 may perform the service based on sensing information received from one or more devices. In particular, the hub apparatus 100 may generate a control command, and transmit the control command to the master device 1500 to perform the service.

Figure 16A:
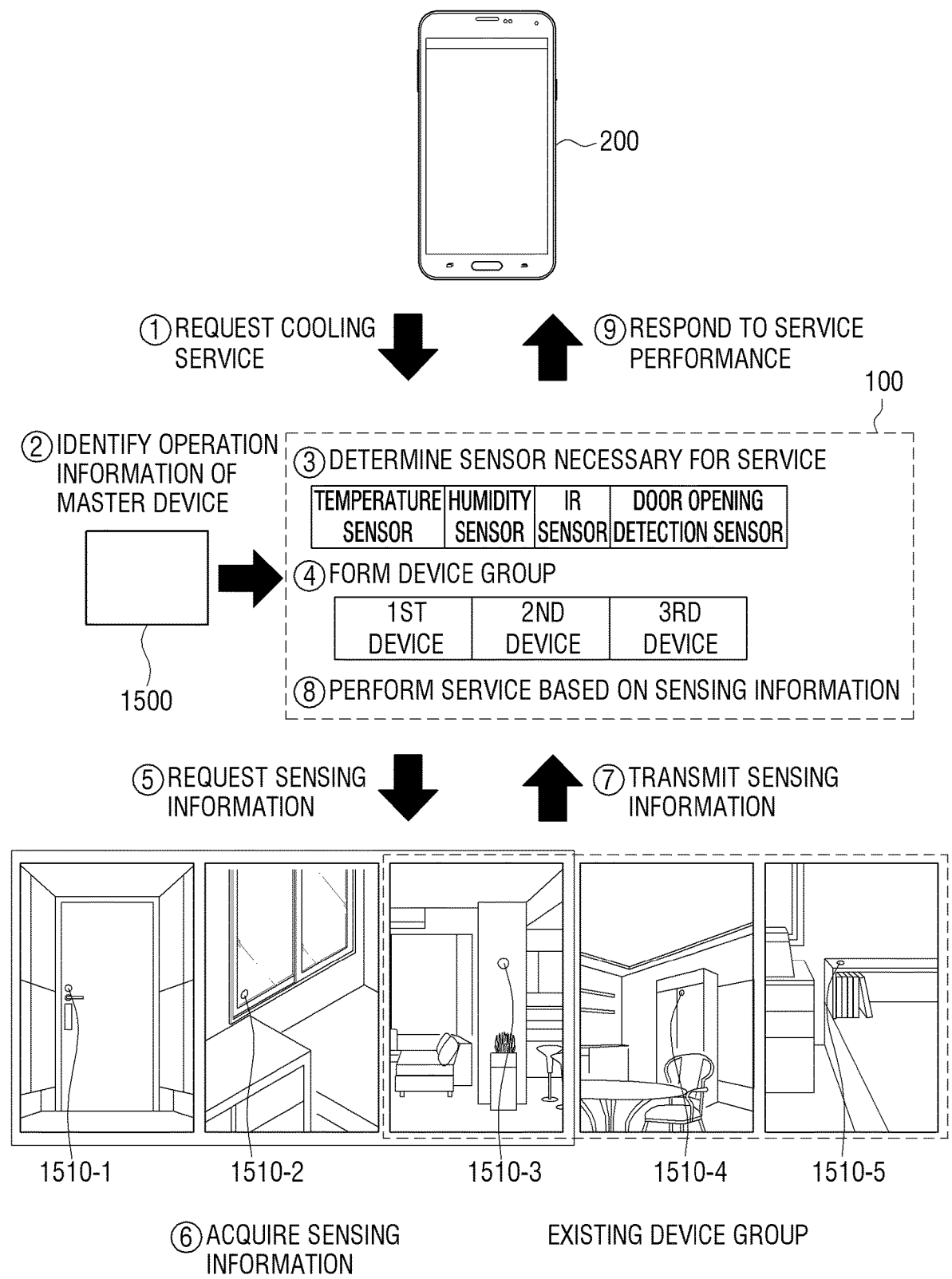
FIGS. 16A and 16B illustrate methods for providing services in a service providing system according to various embodiments of the present disclosure.

FIG. 16A illustrates a method for providing a service in a service providing system according to an embodiment of the present disclosure.

Referring to FIG. 16A, in operation 1, the user terminal 200 requests a service from the hub apparatus 100 according to a user command.

In operation 2, the hub apparatus 100 receives state information of the master device 1500. For example, the hub apparatus 100 may receive information on whether the master device 1500 is turned on or off, mode information of the master device 1500, location information of the master device 1500, etc.

In operation 3, the hub apparatus 100 determines a sensor for the service, based on the state information of the master device 1500. For example, the hub apparatus 100 may determine the power state of the master device 1500 and determine whether to perform the service. In addition, the hub apparatus 100 may determine a service desired by the user based on the mode information of the master device 1500. For example, in response to the mode set by the master device 1500 being a security mode, the hub apparatus 100 may determine that the service requested by the user is a security service. As another example, in response to the mode set by the master device 1500 being an air cleaning mode, the hub apparatus 100 may determine that the service requested by the user is an air cleaning service.

In addition, the hub apparatus 100 may determine the location information of the master device 1500 and determine a service desired by the user. For example, in response to the master device 1500 being located on an air conditioner, the hub apparatus 100 may determine that the service desired by the user is an air conditioning service, and in response to the master device 1500 being located on a window or a front gate, the hub apparatus 100 may determine that the service desired by the user is a security service.

In response to the service desired by the user being determined based on the operation of the maser device 1500, the hub apparatus 100 may identify a sensor for the determined service. For example, in response to the service desired by the user being the air conditioning service, the hub apparatus 100 may determine a temperature sensor, a humidity sensor, a door opening detection sensor, and an IR sensor as sensors for performing the air conditioning service. In addition, the hub apparatus 100 may determine a device including the temperature sensor, the humidity sensor, the door opening detection sensor, and the IR sensor. In response to the third slave device 1510-3 including the IR sensor being provided by an existing service, the hub apparatus 100 may determine the first slave device 1510-1 as a slave device provided with the door opening detection sensor, the second slave device 1510-2 as a slave device provided with the temperature sensor and the humidity sensor, and the third slave device 1510-3 as a slave device provided with the IR sensor. Accordingly, in operation 4, the hub apparatus 100 may form a device group with the first slave device 1510-1, the second slave device 1510-2, and the third slave device 1510-3, in order to perform the air conditioning service.

In operation 5, the hub apparatus 100 requests the first slave device 1510-1, the second slave device 1510-2, and the third slave device 1510-3 to form the device group. A request signal for forming the device group, which is transmitted by the hub apparatus 100, may also include a request for sensing information.

In operation 6, the first slave device 1510-1, the second slave device 1510-2, and the third slave device 1510-3, which form the device group to perform the air conditioning service, detect sensing information for performing the air conditioning service, and in operation 7, deliver the sensing information to the hub apparatus 100.

In operation 8, the hub apparatus 100 perform the air conditioning service requested by the user based on the delivered sensing information, and in operation 9, transmits a response to the service request to the user terminal 200.

Figure 16B:
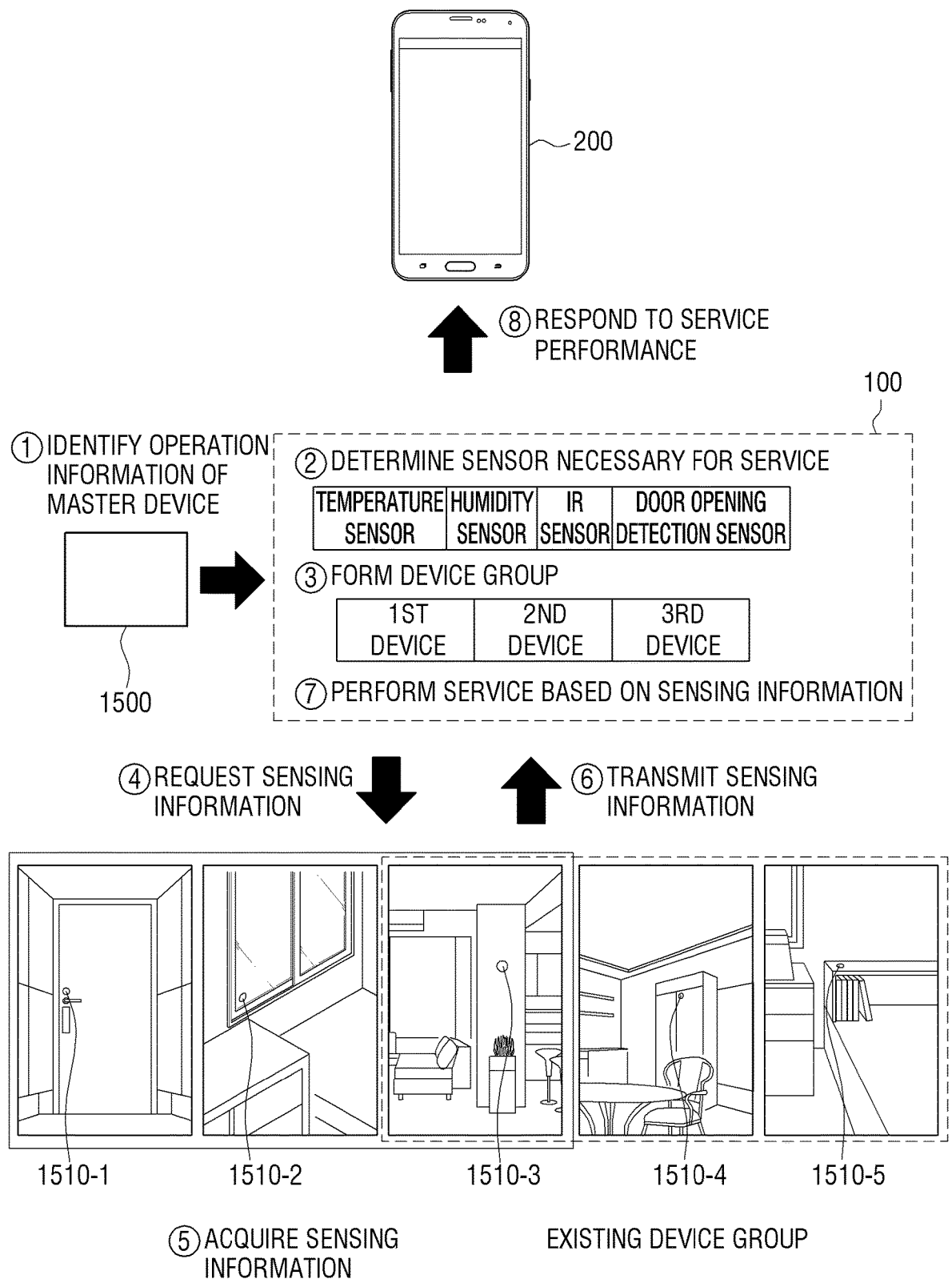

FIG. 16B illustrates a method for providing a service in a service providing system according to an embodiment of the present disclosure.

Referring to FIG. 16B, in operation 1, the hub apparatus 100 identifies state information of the master device 1500. In particular, the hub apparatus 100 may detect a mode change, a location change, etc., of the master device 1500. For example, the hub apparatus 100 may receive information on the mode change or location change from the master device 1500, and detect the mode change or location change of the master device 1500. However, this is merely an example, and the hub apparatus 100 may detect the location change of the master device 1500 by itself.

In operation 2, the hub apparatus 100 determines a sensor for a service based on the state information of the master device 1500. Specifically, the hub apparatus 100 may determine a changed mode of the master device 1500 and determine a service desired by the user. For example, in response to the mode of the master device 1500 being changed from a security mode to an air conditioning mode, the hub apparatus 100 may determine that the service requested by the user is an air conditioning service. In addition, the hub apparatus 100 may determine a location change of the master device 1500 and determine a service desired by the user. For example, in response to the location of the master device 1500 being changed to an air conditioner, the hub apparatus 100 may determine that the service desired by the user is the air conditioning service.

In response to the service desired by the user being determined based on the operation of the maser device 1500, the hub apparatus 100 may determine a sensor for the determined service. For example, in response to the service desired by the user being the air conditioning service, the hub apparatus 100 may define a temperature sensor, a humidity sensor, a door opening detection sensor, and an IR sensor as sensors for performing the air conditioning service. In addition, the hub apparatus 100 may determine a device including the temperature sensor, the humidity sensor, the door opening detection sensor, and the IR sensor. In operation 3, the hub apparatus 100 may form a device group with the first slave device 1510-1, the second slave device 1510-2, and the third slave device 1510-3 to perform the air conditioning service.

In operation 4, the hub apparatus 100 requests the first slave device 1510-1, the second slave device 1510-2, and the third slave device 1510-3 to form the device group. A request signal for forming the device group, which is transmitted by the hub apparatus 100, may include a request for sensing information.

In operation 5, the first slave device 1510-1, the second slave device 1510-2, and the third slave device 1510-3, which form the device group to perform the air conditioning service, acquire sensing information for performing the air conditioning service, and in operation 6, deliver the sensing information to the hub apparatus 100.

In operation 7, the hub apparatus 100 performs a temperature management service, as requested by the user, based on the delivered sensing information, and in operation 8, transmits a response to the service request to the user terminal 200.

As illustrated in FIG. 16B, the user can perform a service more easily by simply changing only the mode or location of the maser device 1500, without directly requesting the service through the user terminal 200.

In the above-described embodiment, the hub apparatus 100 identifies the operation of the master device 1500 and determines a service. However, this is merely an example.

The master device 1500 may operate as the hub apparatus and may control the plurality of slave devices 1510-1, . . . , 1510-n without the hub apparatus 100. That is, the master device 1500 may transmit a service requested by the user to the plurality of slave devices 1510-1, . . . , 1510-n without the separate hub apparatus 100, and perform the service requested by the user based on sensing information received from the plurality of slave devices 1510-1, . . . , 1510-n. For example, in response to the master device 1500 being attached to an entrance door, the master device 1500 determines that the service requested by the user is a security service and requests sensing information from the plurality of slave device 1510-1, . . . , 1510-n related to the security service. In addition, the master device 1500 may provide the security service based on the sensing information received from the plurality of slave devices 1510-1, . . . , 1510-n.

In another embodiment, in response to the master device 1500 being attached an air cleaner, the master device 1500 may determine that the service requested by the user is an auto air cleaning service.

A device, such as the device 300 or the slave device 1510, may analyze the motion of an object and the state of a space based on a change in the intensity of a beacon signal, and control power on/off based on the result of the analyzing.

Specifically, the device may periodically or aperiodically generate a beacon signal, and detect the intensity of the reflected beacon signal. The device may then identify the motion of an object and the state of a space, based on the detected intensity of the beacon signal. In addition, the device may control power on/off based the motion of the object or the state of the space. For example, in response to determining that a person or an object does not move based on the intensity of the beacon signal, the device may turn off the power. However, in response to determining that a person or an object moves, the device may turn on the power. As described above, by turning on or off the power of the device, based on the motion of a person or an object, power consumption can be reduced.

Referring again to FIG. 1, in response to the first device 300-1 being turned off while a device group is being formed, the hub apparatus 100 may remove the first device 300-1 from the device group, and may add another device which is currently turned on as an element of the device group.

Figure 17:
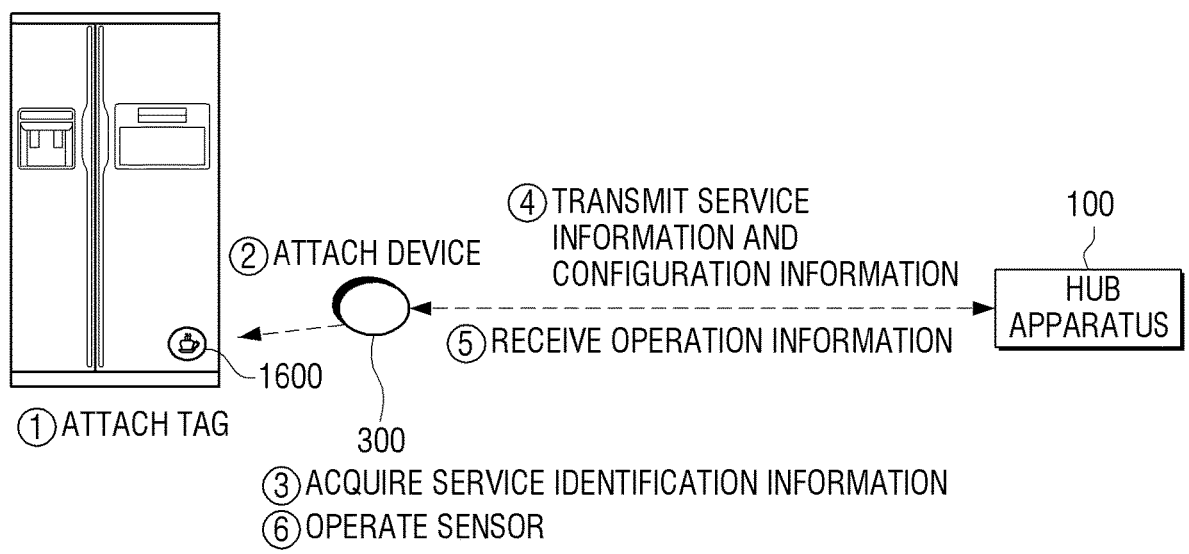
FIG. 17 illustrates a method for providing a service in response to a tag being separately provided according to an embodiment of the present disclosure.

FIG. 17 illustrates a method for providing a service in response to a tag being separately provided according to an embodiment of the present disclosure.

Referring to FIG. 17, a tag 1600 refers to an object that is located on a specific device or thing, and includes service identification information. As illustrated in FIG. 17, the tag 1600 may have a physical form of a sticker type. However, the tag 1600 may also be implemented by using a software configuration, rather than a separate physical form. For example, the tag 1600 may be implemented by using a service list screen, a quick response (QR) code, a portable terminal that provides object recognition, and/or a device having low-power liquid crystal. The tag 1600 may transmit the service identification information, e.g., through NFC, and provide the service identification information by broadcasting, e.g., through Bluetooth low energy (BLE). However, this should not be considered as limiting.

Figure 18A:
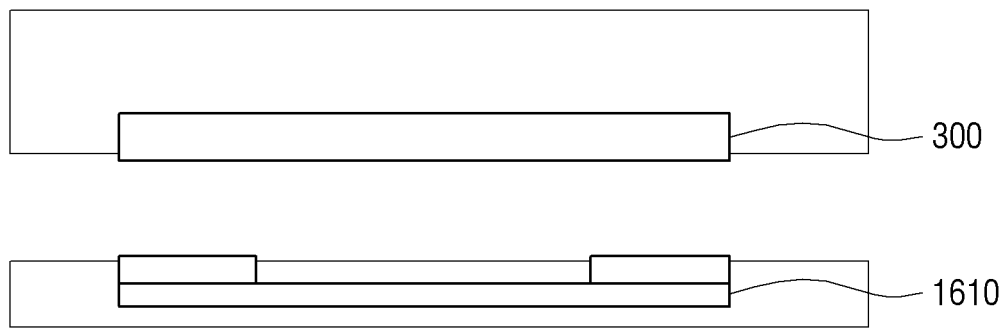
FIG. 18A illustrates the attachment of a tag to a device according to an embodiment of the present disclosure.

The tag 1600 may be attached to the device 300. For example, the tag 1600 may be attached to the device 300 through an attachment part 1610 as illustrated in FIG. 18A.

When the tag 1600 is attached to the device 300, the device 300 may detect whether a current flows in a closed circuit according to implementation of a counterpart circuit, and detect whether the tag 1600 is attached.

When the tag 1600 being attached to the device 300 is detected, the device 300 may receive service identification information from the tag 1600 and store the service identification information. The service identification information may be information related to a specific device or thing where the tag 1600 is located, and information related to a service which may be performed by the specific device or thing.

In addition, the device 300 may acquire service identification information, device information, security information, etc. The device information may include sensor configuration information, and the sensor configuration information may include information on one or more sensors included in the device.

The device 300 may transmits the service identification information and the sensor configuration information to the hub apparatus 100. In addition, the hub apparatus 100 may determine a service based on the service identification information and the sensor configuration information, and provide operation information to the device 300 according to the determined service. Herein, the operation information refers to, but not limited to, information on whether a sensor included in the device 300 is activated or not, a sensing period, a sensing condition, etc.

Examples of service information, sensor configuration information of the device, and operation information are as shown below in Table 4.

TABLE 4

| Service information | Sensor configuration information of the device | Operation information |
|---|---|---|
| Air conditioning service | A temperature sensor, a humidity sensor, an acceleration sensor, and an illuminance sensor | The temperature sensor and the humidity sensor are turned on. The acceleration sensor and the illuminance sensor are turned off. Sensing period and sensing condition |

Figure 18B:
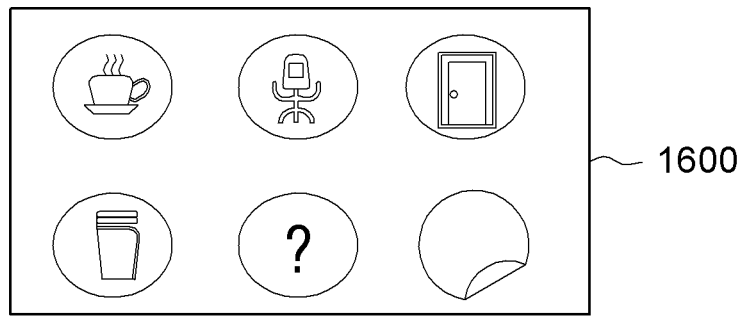
FIG. 18B illustrates a sticker type tag according to an embodiment of the present disclosure.

The tag 1600 may have a physical form of a sticker type as illustrated in FIG. 18B. However, the tag 1600 may be implemented by using a software configuration rather than a separate physical form. For example, the tag 1600 may be implemented by using a service list screen, a QR code, a portable terminal that provides object recognition, or a device having a low-power liquid crystal.

Figure 19A:
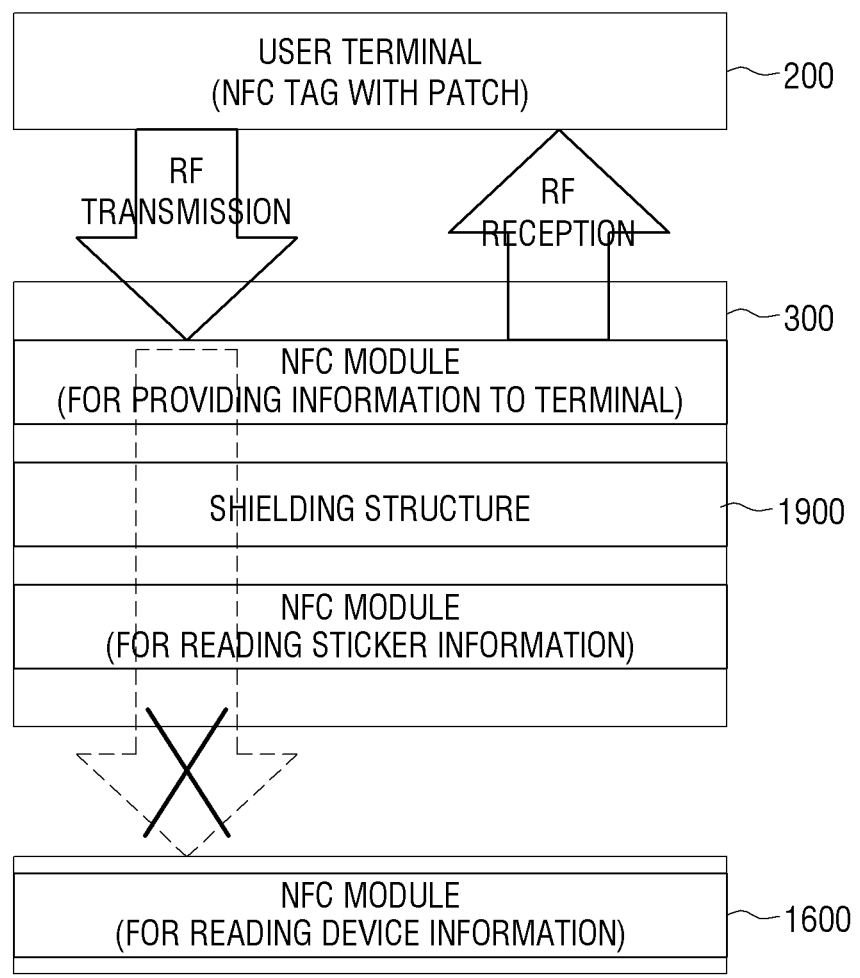
FIG. 19A illustrates RF transmission between a terminal, a device, and a tag according to an embodiment of the present disclosure.

FIG. 19A illustrates RF transmission between a terminal, a device, and a tag according to an embodiment of the present disclosure.

Referring to FIG. 19A, as described above, the tag 1600 may transmit service information, e.g., through an NFC chip, and provide the service information by broadcasting, e.g., through BLE. However, in response to the tag 1600 transmitting service information using the NFC chip, the device 300 may have a shielding structure 1900 as illustrated in FIG. 19A. Specifically, the device 300 may have the shielding structure 1900 to prevent the NFC unit 250 of the user terminal 200 from being disturbed by the NFC chip (or module) of the tag 1600, as illustrated in FIG. 19A.

Figure 19B:
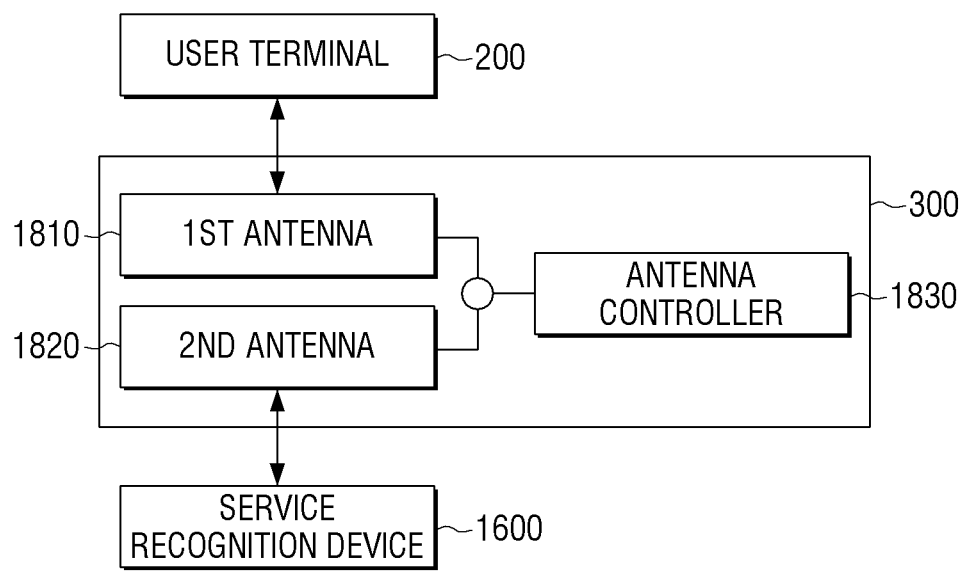
FIG. 19B illustrates RF transmission between a terminal, a device, and a tag according to an embodiment of the present disclosure.

FIG. 19B illustrates RF transmission between a terminal, a device, and a tag according to an embodiment of the present disclosure.

In addition, as shown in FIG. 19B, a device 1800 includes a first antenna 1810 to exchange information with the user terminal 200, and a second antenna 1820 to exchange information with the tag 1600. In addition, the device 1800 includes an antenna controller 1830 to selectively operate one of the first antenna 1810 and the second antenna 1820 according to a type of a device that the device 1800 wishes to communicate with.

Accordingly, smooth communication can be performed between the user terminal 200 and the tag 1600 through the device structures illustrated in FIGS. 19A and 19B.

Figure 20:
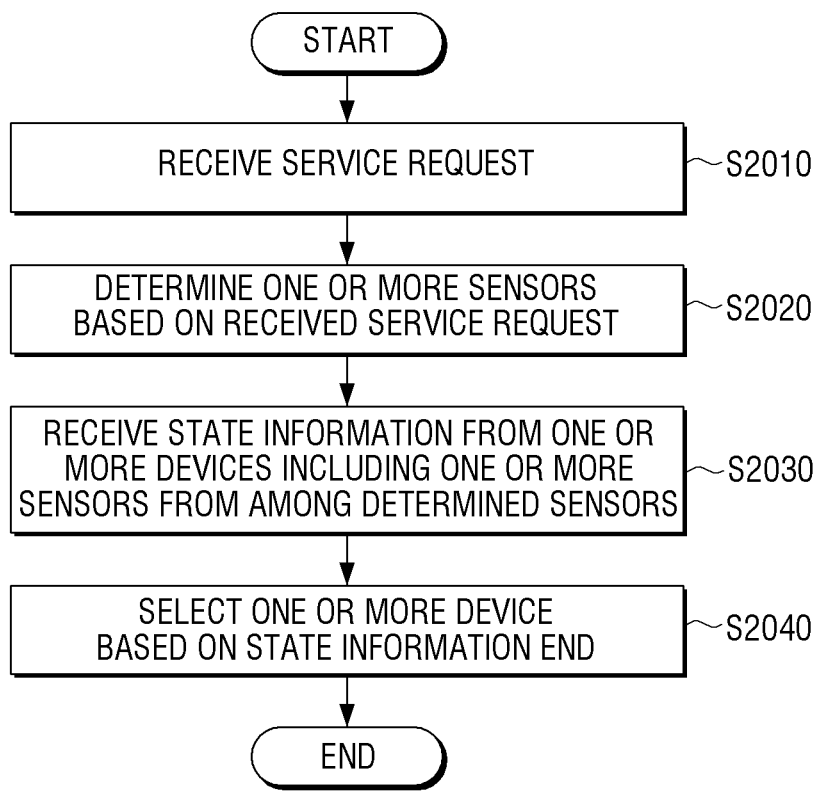
FIG. 20 is a flowchart illustrating a method for providing a service of a hub apparatus according to an embodiment of the present disclosure.

FIG. 20 is a flowchart to illustrating a method for providing a service of a hub apparatus according to an embodiment of the present disclosure.

Referring to FIG. 20, the hub apparatus 100 receives a service request from an external device in step S2010. For example, the hub apparatus 100 may receive a service request from the user terminal 200, or may directly receive a service request and may receive a service request through the master device 1500.

In step S2020, the hub apparatus 100 determines one or more sensors to perform a service in response to the service request. For example, the hub apparatus 100 may compare service identification information included in the request signal and pre-stored service information, and determine one or more sensors for performing the service.

In step S2030, the hub apparatus 100 receives state information from one or more devices including one or more sensors from among the determined sensors. For example, the state information may include location information of the device, battery information of the device, and use history information of the device.

In step S2040, the hub apparatus 100 selects one or more devices based on the state information.

Figure 21:
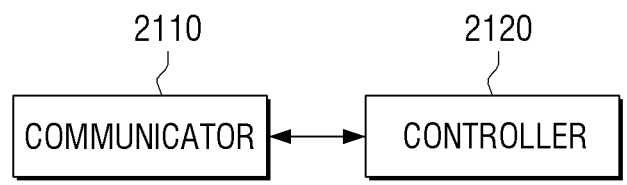
FIG. 21 illustrates a hub apparatus according to an embodiment of the present disclosure.

FIG. 21 illustrates a hub apparatus 2100 according to an embodiment of the present disclosure.

Referring to FIG. 21, the hub apparatus includes a communicator 2110 and a controller 2120.

The communicator 2110 communicates with an external device. The communicator 2110 may receive a service request from a user terminal, transmit a signal for requesting sensing information to a device, and receive the sensing information from the device.

The controller 2120 controls an overall operation of the hub apparatus.

In response to a service request being received, the controller 2120 may determine one or more sensors for performing a service in response to the service request, and designate one or more devices to include one or more sensors based on a predetermined condition. In addition, the controller 2120 may form a device group including the designated one or more devices, and control the communicator 2110 to transmit a signal for requesting sensing information to one or more devices. In response to the sensing information being received from one or more devices, the controller 2120 performs the service based on the sensing information.

The controller 2120 compares service identification information included in the request signal and pre-stored service information, and determines one or more sensors for performing the service. In addition, the controller 2120 controls the communicator 2110 to receive state information from one or more devices including one or more sensors from among the determined sensors. In addition, the controller 2120 may determine one or more devices including the sensors for performing the service based on the state information. The controller 2120 may determine the one or more devices using at least one of the number of devices forming the device group, the location of the device, the battery information of the device, and the use history of the device.

In response to there being a device including a previously used sensor from among the sensors for performing the service, the controller 2120 may determine the device including the previously used sensor as an element of the device group. In addition, the controller 2120 may form the device group including the determined one or more devices.

The controller 2120 may control the communicator 2110 to transmit a signal for requesting sensing information to each of the plurality of devices included in the device group.

In response to sensing information being received from the plurality of devices through the communicator 2110, the controller 2120 may perform a service requested by the user based on the received sensing information.

As described above, a hub apparatus can provide various services to the user using a limited number of devices. In addition, the devices of the movable patch type can be managed and connected more easily.

Figure 22:
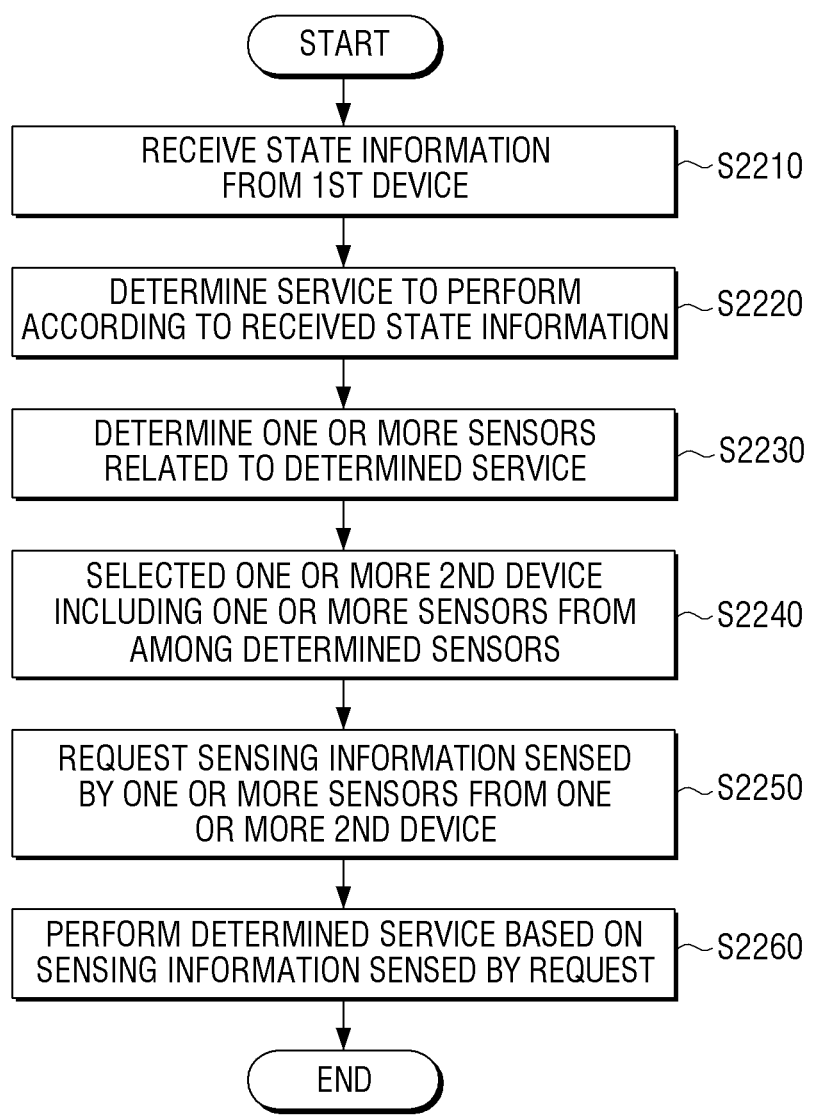
FIG. 22 is a flowchart illustrating a method for controlling a device by a hub apparatus according to an embodiment of the present disclosure.

FIG. 22 is a flowchart illustrating a method for controlling a device by a hub apparatus according to an embodiment of the present disclosure.

Referring to FIG. 22, the hub apparatus acquires state information from a first device in step S2210. For example, the state information of the first device may include at least one of mode information of the first device and location information of the first device. The first device may be a master device.

In step S2220, the hub apparatus determines a service to perform according to the state information. For example, in response to the mode of the first device being an air conditioning mode or the first device being attached to an air conditioner, the hub apparatus may determine an air conditioning service as a service to perform.

In step S2230, the hub apparatus determines one or more sensors related to the determined service. For example, in response to the air conditioning service being determined, the hub apparatus may determine a temperature sensor and a humidity sensor as sensors related to the determined service.

In step S2240, the hub apparatus selects one or more second devices including one or more sensors from among the determined sensors. For example, the hub apparatus may select a device including the temperature sensor and the humidity sensor as the second device. The second device may be a slave device.

In step S2250, the hub apparatus requests sensing information sensed by one or more sensors from one or more second devices. For example, the hub apparatus may request sensing information measured by the temperature sensor and the humidity sensor from the device.

In step S2260, the hub apparatus 10 performs the determined service based on the sensing information sensed by the request. For example, the hub apparatus may perform the air conditioning service based on temperature sensing information and humidity sensing information, which are received from the device including the temperature sensor and the humidity sensor.

As described above, because the service is performed based on the state information of the first device, the user can be provided with the service more intuitively and more easily.

Figure 23:
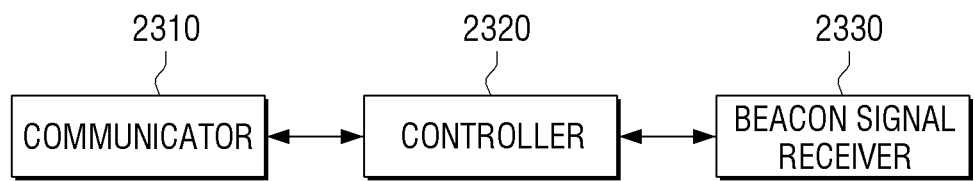
FIG. 23 illustrates a hub apparatus according to an embodiment of the present disclosure.

FIG. 23 illustrates a hub apparatus according to an embodiment of the present disclosure.

Referring to FIG. 23, the hub apparatus includes a communicator 2310, a beacon signal receiver 2320, and a controller 2330.

The communicator 2310 communicates with an external device. For example, the communicator 2310 may communicate with the user terminal 200 or device 300 as illustrated in FIG. 1.

The beacon signal receiver 2320 receives a beacon signal discharged from the external device.

The controller 2330 controls an overall operation of the hub apparatus. The controller 2330 may determine a motion of an object located within a specific space, based on a change in the intensity of the beacon signal, and control power of the external device, based on the result of the determining.

The controller 2330 may determine the motion of the object based on the intensity of the beacon signal. In response to there being a change in the intensity of the beacon signal, the controller 2330 may determine that the object between the hub apparatus and the device external moves, and, in response to there not being a change in the intensity of the beacon signal, the controller 2330 may determine that the object between the hub apparatus and the external device does not move.

When it is determined that the object located within the specific space moves, the controller 2330 may control the communicator 2310 to transmit a control signal for turning on the power of the external device to the external device. However, when it is determined that the object located within the specific space does not move, the controller 2330 may control the communicator 2310 to transmit a control signal for turning off the power of the external device to the external device. That is, in response to there being no motion of the object, the power of the external device is turned off, and thus, power consumption can be reduced.

In addition, the controller 2330 may form a device group based on the intensity of the beacon signal. For example, in response to there being no object between the hub apparatus and the external device or there being no motion of the object in forming a device group with a plurality of devices to perform a specific service, the controller 2330 may exclude the external device from the device group. In addition, in response to a motion of the object between the hub apparatus and the external device being detected again through the beacon signal, the controller 2330 may include the external device in the device group.

The controller 2330 may determine a service based on the intensity of the beacon signal. For example, the controller 2330 may determine whether there are many people between the hub apparatus and the external device based on the intensity of the beacon signal. That is, in response to the intensity of the beacon signal being less than or equal to a predetermined value, the controller 2330 may determine that there are many people between the hub apparatus and the external device, because the beacon signal is disturbed by the many people.

The controller 2330 may determine one or more sensors to perform the determined service and designate one or more devices to include one or more sensors based on a predetermined condition. For example, in response to determining that the intensity of the beacon signal is less than a predetermined value, the controller 2330 may determine to perform an air management service, determine one or more sensors to perform the air management service, and designate one or more devices to include one or more sensors based on a predetermined condition and generate a device group.

Figure 24:
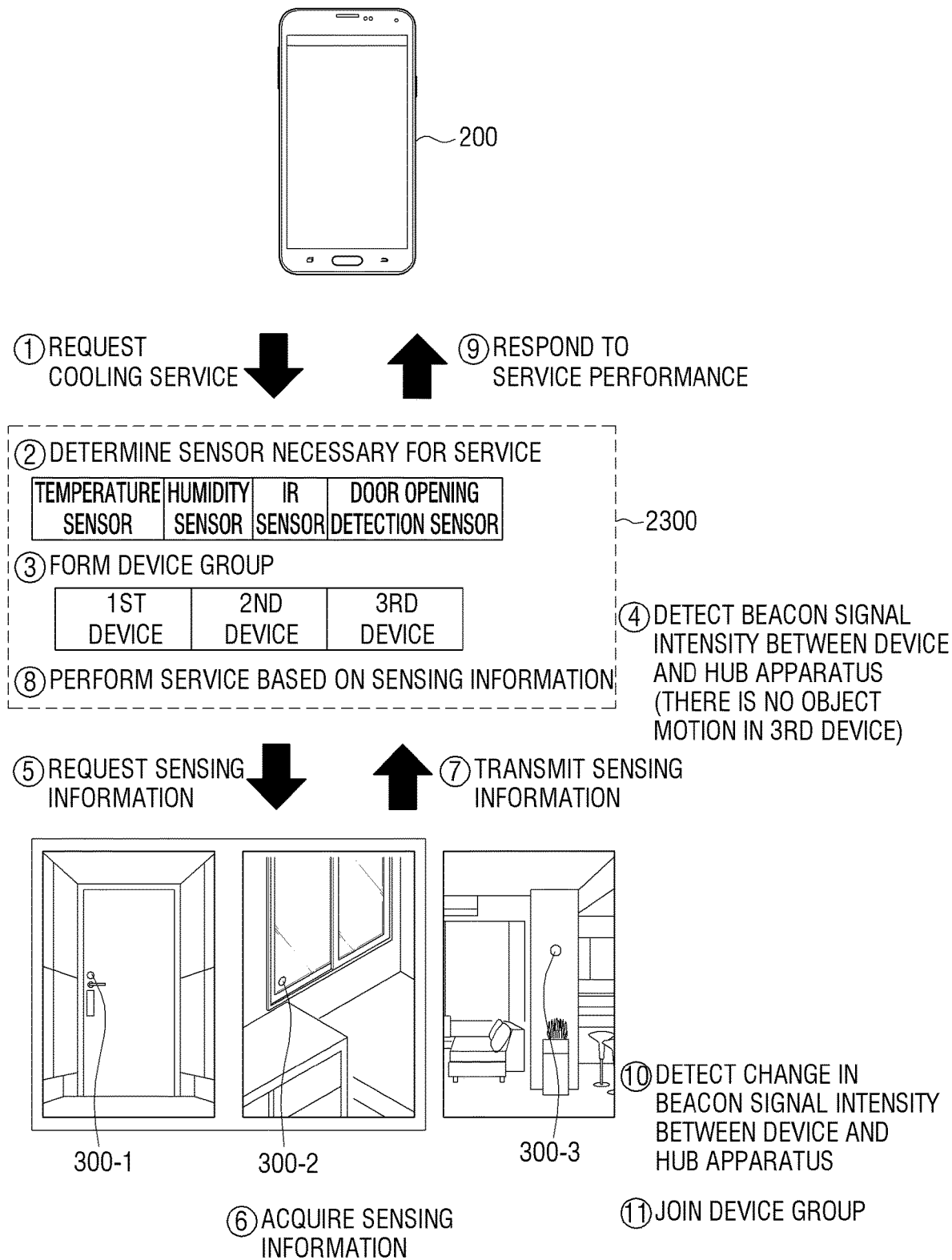
FIG. 24 illustrates an embodiment for providing an air conditioning service to a user using a service providing system according to an embodiment of the present disclosure.

FIG. 24 illustrates an embodiment for providing an air conditioning service to a user using a service providing system according to an embodiment of the present disclosure.

Referring to FIG. 24, in operation 1, the user terminal 200 requests an air conditioning service from a hub apparatus 2300. A request signal may include service identification information of the air conditioning service.

In operation 2, the hub apparatus 2300 determines sensors for the service in response to the air conditioning service request. For example, the hub apparatus 2300 may compare the service identification information included in the request signal received from the user terminal 200 and pre-stored service information, and determine "a temperature sensor, a humidity sensor, an IR sensor, a door opening detection sensor" as the sensors for the air conditioning service.

In addition, the hub apparatus 2300 determines devices including the temperature sensor, the humidity sensor, the IR sensor, and the door opening detection sensor.

In operation 3, the hub apparatus 2300 determines devices to form a device group from among the devices including the temperature sensor, the humidity sensor, the IR sensor, and the door opening detection sensor.

As described above, the hub apparatus 2300 may determine devices to form the device group using at least one of the number of devices forming the device group, the location of the device, the battery information of the device, and the use history information of the device. For example, the hub apparatus 2300 may determine a first device 300-1 as a device provided with the door opening detection sensor, a second device 300-2 as a device provided with the temperature sensor and the humidity sensor, and a third device 300-3 as a device provided with the IR sensor.

In operation 4, the hub apparatus 2300 detects the intensity of a beacon signal between the first to third devices 300-1 to 300-3 and the hub apparatus 2300. When it is determined that there is no change in the intensity of the beacon signal between the hub apparatus 2300 and the third device 300-3, the hub apparatus 2300 may determine that there is no motion of an object in a space where the third device 300-3 is located. Accordingly, the hub apparatus 2300 may form the device group with the first device 300-1 and the second device 300-2.

In operation 5, the hub apparatus 2300 requests sensing information from the first device 300-1 and the second device 300-2.

In operation 6, the first device 300-1 and the second device 300-2, which form the device group to perform an air conditioning service, detect sensing information (e.g., temperature information, humidity information, door opening detection information, etc.) for performing the air conditioning service, and in operation 7, deliver the sensing information to the hub apparatus 2300.

In operation 8, the hub apparatus 2300 performs the air conditioning service requested by the user based on the delivered sensing information, and in operation 9, transmits a response to the service request to the user terminal 200. For example, the hub apparatus 100 may determine the current temperature based on the received sensing information, and compare the current temperature and temperature requested by the user. When the current temperature is higher than the temperature requested by the user, the hub apparatus 2300 may close a window and operate an air conditioner. The hub apparatus 2300 may deliver the current temperature information and the result of the controlling to the user terminal 200, and the user terminal 200 may display the current temperature information and the result of the controlling.

In operation 10, the hub apparatus 2300 detects a change in the intensity of the beacon signal between the third device 300-3 and the hub apparatus 2300. That is, the hub apparatus 2300 may determine that there is a person in the space where the third device 300-3 is located. As a result, in operation 11, the hub apparatus 2300 may add the third device 300-3 to the device group, such that the first device 300-1, the second device 300-2, and the third device 300-3 may form a new device group.

Figure 25:
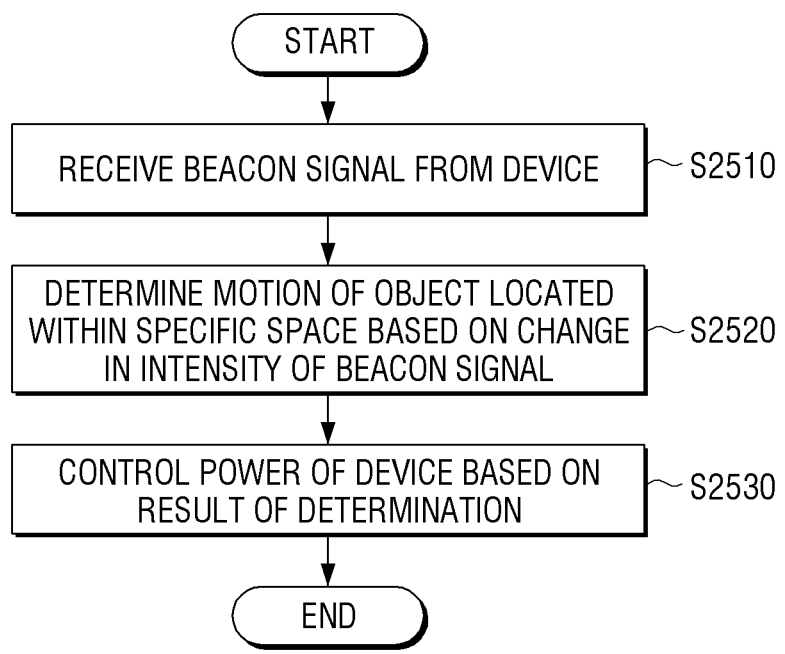
FIG. 25 is a flowchart illustrating a method for controlling a hub apparatus according to an embodiment of the present disclosure.

FIG. 25 is a flowchart illustrating a method for controlling of a hub apparatus according to an embodiment of the present disclosure.

Referring to FIG. 25, the hub apparatus receives a beacon signal from a device in step S2510.

In steps S2520, the hub apparatus determines a motion of an object located in a specific space based on a change in the intensity of the beacon signal. For example, in response to the intensity of the beacon signal being changed, the hub apparatus may determine that there is a motion of the object located in the specific space (i.e., the space where the device is located). However, in response to the intensity of the beacon signal not being changed, the hub apparatus may determine that there is no motion of the object located in the specific space.

In step S2530, the hub apparatus controls power of the device based on the result of the determining. For example, in response to there being a motion of the object in the specific space, the hub apparatus may turn on the power of the device, or in response to there being no motion of the object in the specific space, the hub apparatus may turn off the power of the device.

By turning on/off the power of the device based on the change in the intensity of the beacon signal as described above, unnecessary power consumption of the device can be prevented.

Figure 26:
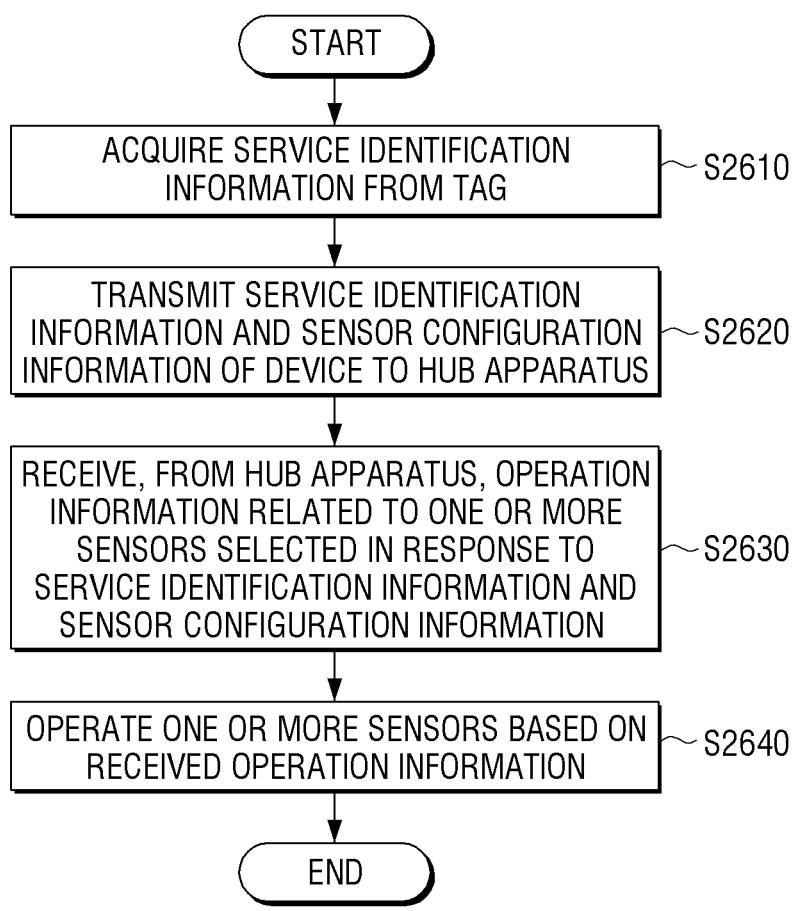
FIG. 26 is a flowchart illustrating a method for operating of a device according to an embodiment of the present disclosure.

FIG. 26 is a flowchart illustrating a method for operating a device according to an embodiment of the present disclosure.

Referring to FIG. 26, the device acquires service identification information from a tag in step S2610.

In step S2620, the device transmits the service identification information and sensor configuration information of the device to a hub apparatus.

In step S2630, the device receives, from the hub apparatus, operation information related to one or more sensors selected in response to the service identification information and the sensor configuration information.

In step S2640, the device operates one or more sensors based on the received operation information.

Figure 27:
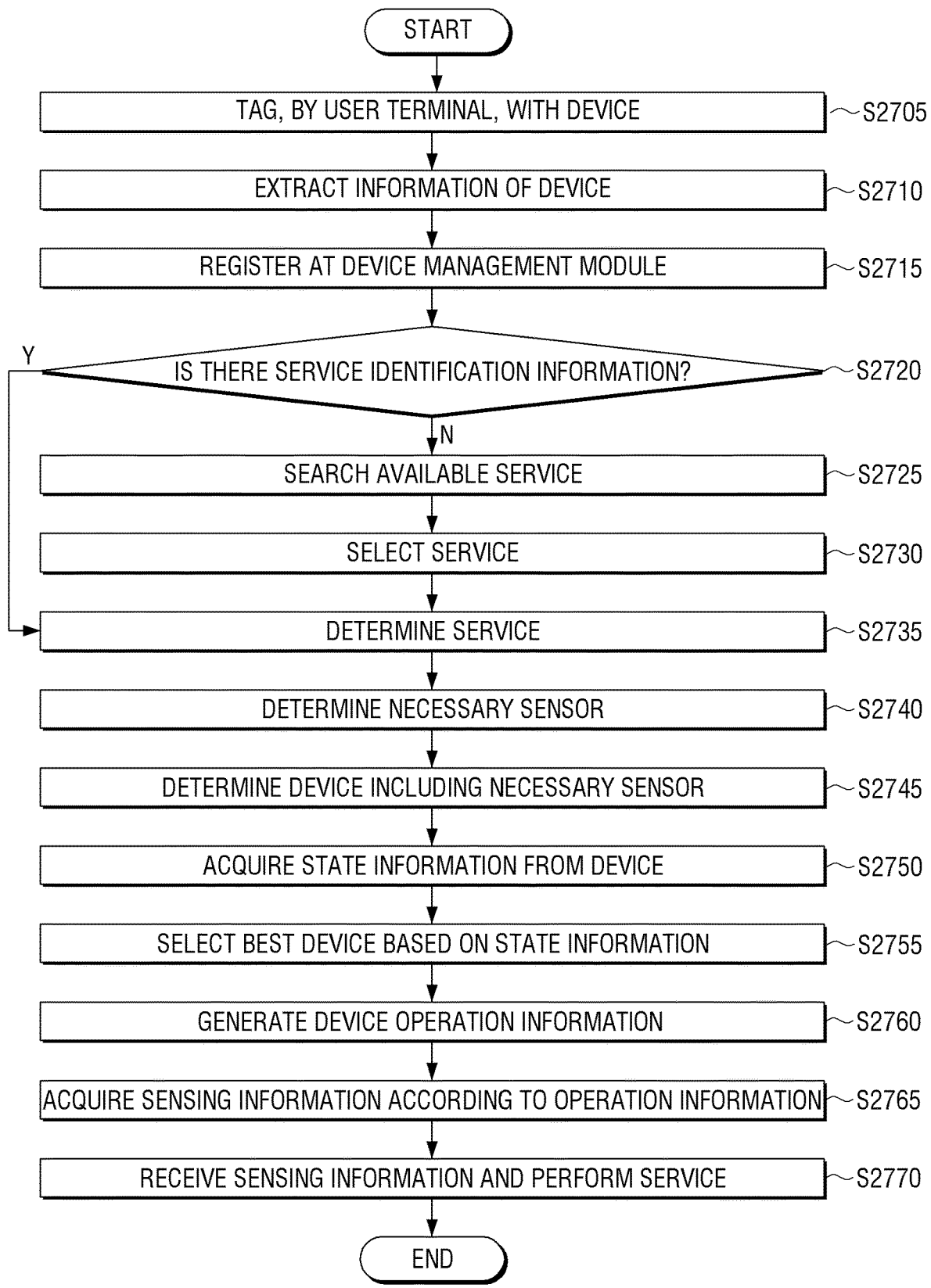
FIG. 27 is a flowchart illustrating a method for providing a service in a service providing system according to an embodiment of the present disclosure.

FIG. 27 is a flowchart illustrating a method for providing a service in a service providing system according to an embodiment of the present disclosure.

Referring to FIG. 27, a user terminal is tagged with a device in step S2705.

In step S2710, the user terminal extracts information, such sensor configuration information, etc., of the device, from the device.

In step S2715, the extracted device information is registered at a device management module, which may be provided in the hub apparatus or in a separate external server.

In step S2720, the user terminal determines whether there is service identification information. That is, the user terminal determines whether service identification information is received from the tagged device.

When there is no service identification information in step S2720, the user terminal searches available services in step S2725, and selects a service according to a user command in step S2730. In steps S2735, the hub apparatus 100 determines a service based on the service selected by the user.

However, when there is service identification information in step S2730, the hub apparatus determines a service based on the service identification information received from the user terminal in step S2735.

In step S2740, the hub apparatus determines sensors for performing the determined service.

In step S2745, the hub apparatus determines devices including the sensors.

In step S2750, the hub apparatus acquires state information of the device (e.g., location information, battery information, use history information, etc.) from the determined device.

In step S2755, the hub apparatus selects a best device based on the state information.

In step S2760, the hub apparatus generates device operation information (e.g., information on a sensor to be activated, a sensing period, a sensing condition, etc.) to be transmitted to the selected device.

In step S2765, the device acquires sensing information according to the operation information.

In step S2770, the hub apparatus receives the acquired sensing information from the device and performs the service.

Figure 28:
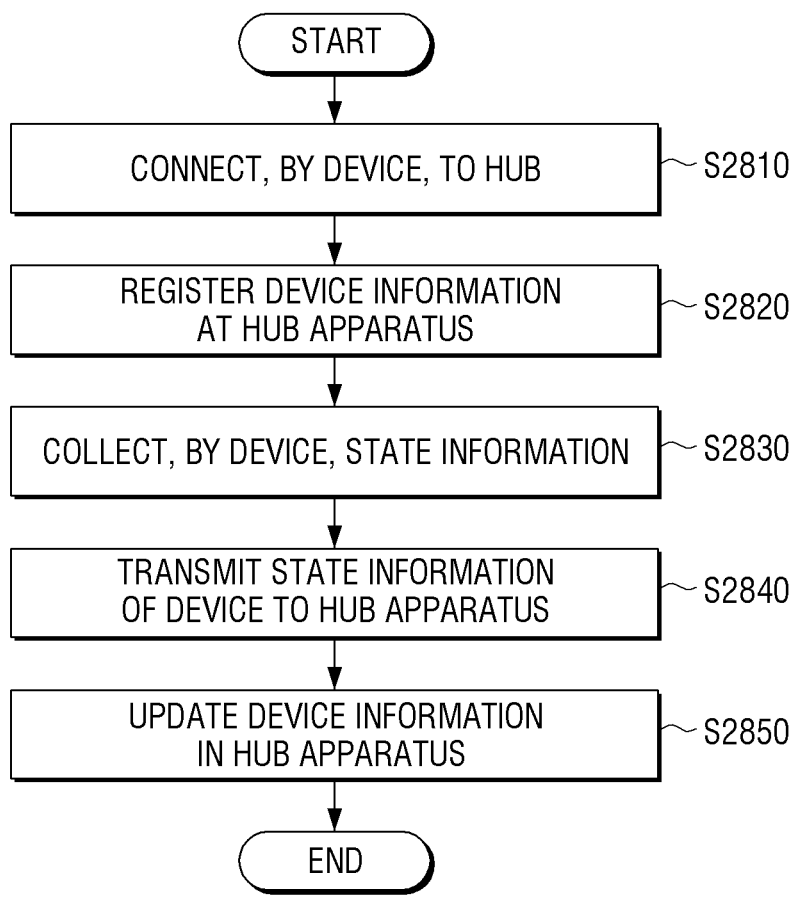
FIG. 28 is a flowchart illustrating a method for managing a device in a service providing system according to an embodiment of the present disclosure.

FIG. 28 is a flowchart illustrating a method for managing a device in a service providing system according to an embodiment of the present disclosure.

Referring to FIG. 28, the device is connected to a hub apparatus in step S2810.

In step S2820, device information is registered at the hub apparatus. For example, the device information may include device ID information, sensor configuration information, state information, etc.

In step S2830, the device collects the state information. For example, the device may acquire the state information at predetermined intervals, and in response to the state of the device being changed, acquire the state information.

In step S2840, the device delivers the state information to the hub apparatus. For example, the device may transmit the state information at predetermined intervals, or may transmit the state information every time the state information is acquired.

In step S2850, the hub apparatus updates the device information stored in the hub apparatus. That is, the hub apparatus may update changed state information of the device information.

Figure 29:
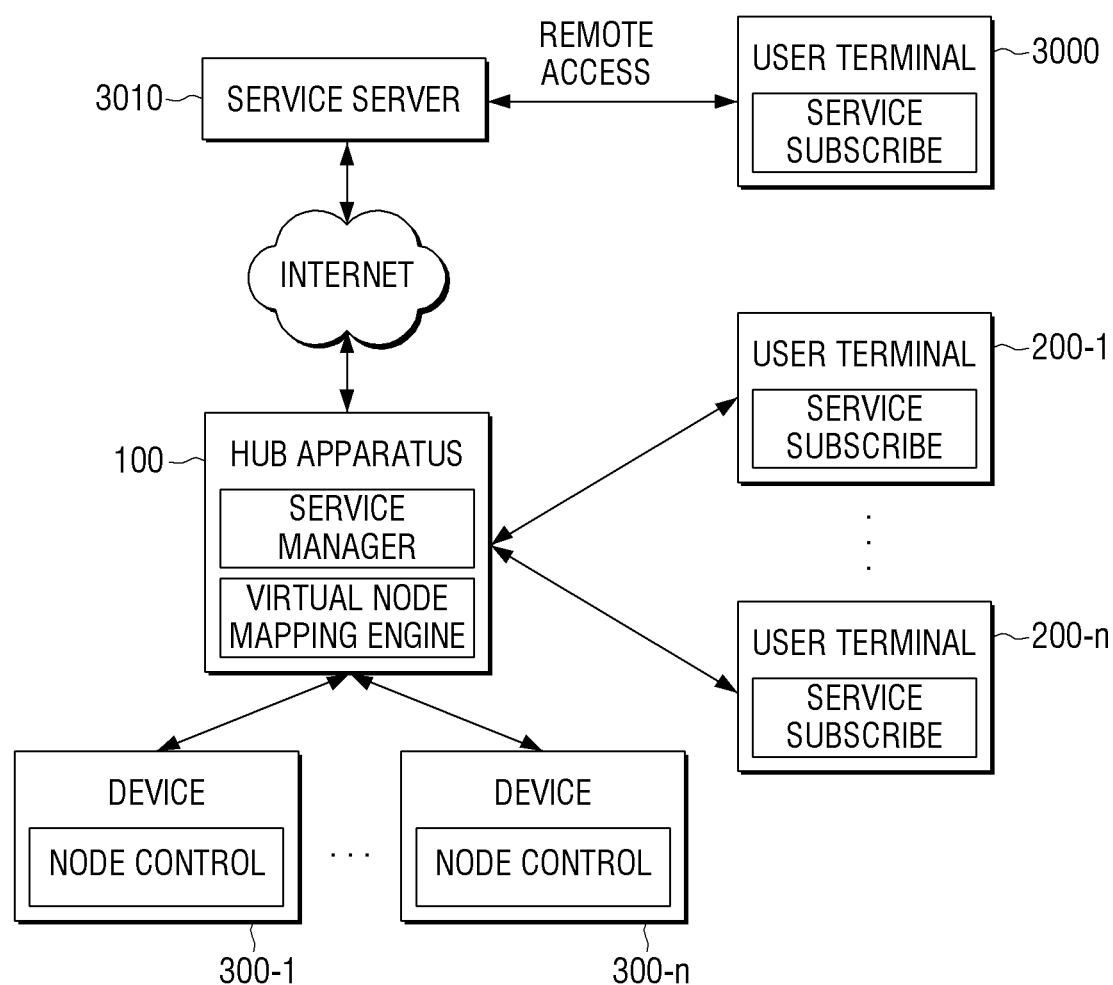
FIG. 29 illustrates service providing system according to an embodiment of the present disclosure.

FIG. 29 illustrates a service providing system according to an embodiment of the present disclosure.

Referring to FIG. 29, the hub apparatus 100 includes a service manager module and a virtual node mapping engine. The service manager module manages a service requested by the user, and the virtual node mapping engine generates a device group to perform the service requested by the user.

The user terminals 200-1 to 200-n each include a service subscription module that selects a service that the user wishes to perform. The user terminals 200-1 to 200-n may directly communicate with the hub apparatus 100 or may communicate with the hub apparatus 100 at a remote distance through a service server 3010 and Internet.

The devices 300-1 to 300-n each include a node control module that controls a sensor according to operation information received from the hub apparatus 100 and performs a service.

According to the above-described embodiments, a user can be provided with various services through the limited number of devices (service nodes).

Although single hub apparatus has been described in each of the above-described embodiments, this is merely an example, and a plurality of local hub apparatuses may be provided.

For example, a service providing system may include a plurality of local hub apparatuses located in a plurality of areas in a house. The plurality of local hub apparatuses may be implemented by using home appliances located in the plurality of areas.

Figure 30:
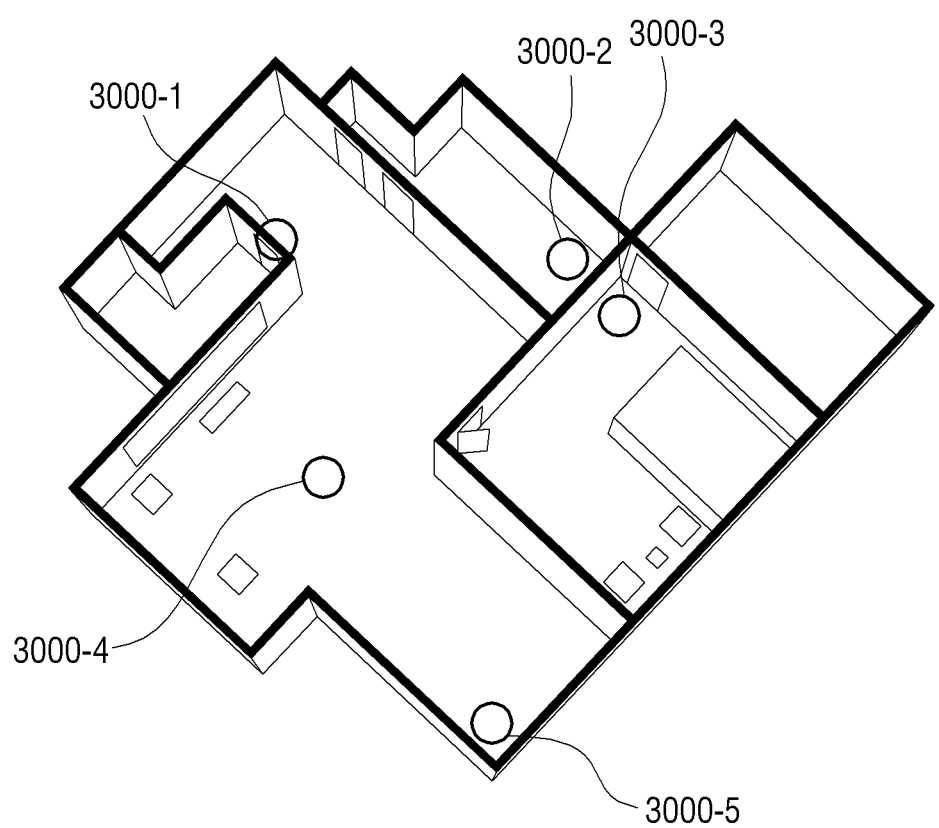
FIG. 30 illustrates a service providing system including a plurality of local hub devices according to an embodiment of the present disclosure.

FIG. 30 illustrates a service providing system including a plurality of local hub devices according to an embodiment of the present disclosure.

Referring to FIG. 30, a porch light may serve as a first local hub apparatus 3000-1 in a front door area, a washing machine may serve as a second local hub apparatus 3000-2 in a laundry room area, a bedroom TV may serve as a third local hub apparatus 3000-3 in a bedroom area, a living room TV may serve as a fourth local hub apparatus 3000-4 in a living room area, and a refrigerator may serve as a fifth local hub apparatus 3000-5 in a kitchen area.

The first to the fifth local hub apparatuses 3000-1 to 3000-5 may manage sensors located in corresponding areas, and receive sensing values. For example, the third local hub apparatus 3000-3 located in the bedroom area may manage sensors (e.g., an illumination sensor, a temperature sensor, a humidity sensor, etc.) located in the bedroom area, and receive sensing values from the sensors located in the bedroom area and perform a service regarding the bedroom area.

The plurality of local hub apparatuses 3000-1 to 3000-5 may be connected with one another for communication, and exchange data and control commands with one another. Alternatively, a main hub apparatus (e.g., a server) for managing the plurality of local hub apparatuses 3000-1 to 3000-5 may be separately provided, such that the plurality of local hub apparatuses 3000-1 to 3000-5 may transmit area information of each of the sensors and sensing values to the main hub apparatus, and the main hub apparatus may perform an overall service in the house based on the area information and the sensing values received from the plurality of local hub devices 3000-1 to 3000-5.

In addition, the plurality of local hub devices 3000-1 to 3000-5 may transmit the area information on the sensors located in corresponding areas of the local hub apparatus 3000-1 to 3000-5 to a service request device (e.g., a smart phone).

Although the plurality of local hub devices 3000-1 to 3000-5 are generally fixed type, this is merely an example, and the plurality of local hub devices 3000-1 to 3000-5 may be implemented by using movable devices. For example, the movable devices may be implemented by using a mobile device that is moved by the user, such as a notebook PC, a tablet PC, etc., or a device that moves by itself, such as a robot cleaner, an electronic pet, etc.

When the local hub apparatus is implemented by using a mobile device which is moved by the user, the mobile device may be implemented as a local hub apparatus of an area where the mobile device is located.

Figure 31A:
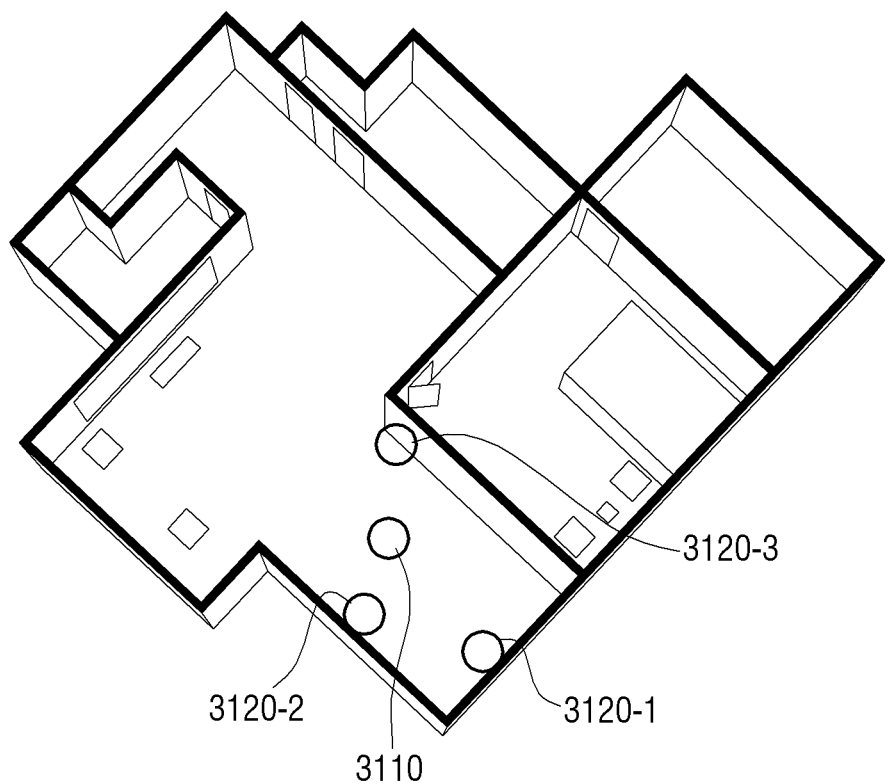
FIGS. 31A and 31B illustrate mobile devices implemented as local hub apparatuses according to an embodiment of the present disclosure.
Figure 31B:
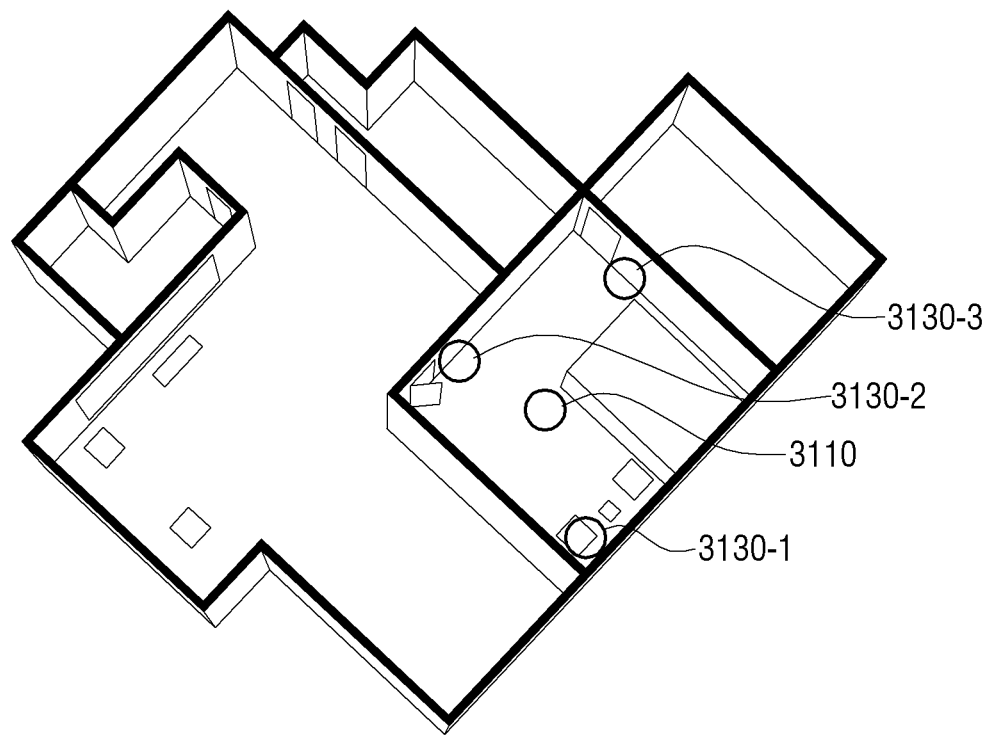

FIGS. 31A and 31B illustrate mobile devices implemented as local hub apparatuses according to an embodiment of the present disclosure.

Referring to FIG. 31A, a mobile device 3110 being located in the living room may be implemented as a local hub apparatus to manage sensors 3120-1, 3120-2, and 3120-3 located in the living room area and receive sensing values from the sensors 3120-1, 3120-2, and 3120-3 located in the living room area.

In response to the mobile device 3110 being moved to the bedroom, as illustrated in FIG. 31B, the mobile device 3110 may be implemented as a local hub apparatus to manage sensors 3130-1, 3130-2, and 3130-3 located in the bed room area and receive sensing values from the sensors 3130-1, 3130-2, and 3130-3 located in the bed room area.

In response to the local hub apparatus being implemented by using a device that can move by itself (e.g., a robot cleaner), and in response to a sensor for performing a service requested by the user deviating from a short-distance communication area, the device may move to an area where the sensor is located and receive a sensing value. For example, in response to a robot cleaner being located at the front door and the sensor being located in the bed room, deviating from the short-distance communication area, the robot cleaner moves near to the bedroom area and acquires sensing values.

When a sensor for performing a service requested by the user is located within the short-distance communication area, but a device for transmitting a control command to perform the service is not located in the short-distance communication area, the device may receive a sensing value from the sensor first, and move to the device for transmitting the control command and transmit the control command generated based on the sensing value. For example, in response to a sensor being located in the bed room and an air conditioner for transmitting a control command being located in the living room, the robot cleaner acquires a sensing value from the sensor located in the bed room area, and moves to the living room and transmit the control command to the air conditioner.

In addition, the plurality of local hub apparatuses may be implemented in the form of a power hub, which is provided with a power transmission unit that transmits ambient charging, and transmits power to the sensors. The plurality of local hub apparatuses may control the power transmission unit based on a power state of sensors and whether there a user exists or not.

According to the above-described embodiments, a device provided with the sensors may be implemented in the form of a patch that is attachable and detachable. Therefore, when an area where the device provided with the sensors is located is changed, a hub apparatus may control the sensors provided in the device according to the location of the device. For example, the hub apparatus may determine whether to activate the sensors provided in the device according to the location of the device.

For example, in response to the device being moved from a window to the kitchen and attached therein, the hub apparatus may inactivate an acceleration sensor for detecting door opening, and activate a temperature sensor for detecting temperature.

In addition, the hub apparatus may determine sensing periods of the sensors provided in the device according to the location of the device. For example, in response to the device being moved from the bedroom to the laundry room and attached therein, the hub apparatus may set the sensing period of the temperature sensor provided in the device to be relatively long.

As described above, by determining whether to activate the sensors and the sensing period according to the location of the device, the system can be operated with relatively low power.

A service providing method of a hub apparatus according to the various embodiments described above may be implemented as a program and provided to a display device or an input device. In particular, the program including the control method of the display device may be stored in a non-transitory computer readable medium.

The non-transitory computer readable medium is a medium that stores data semi-permanently rather than storing data for a very short time, such as a register, a cache, a memory or etc., and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or etc., and may be provided.

While the present disclosure has been shown and described with reference to certain embodiments thereof, it will be understood by those skilled in the art that various changes in form and details may be made therein without departing from the spirit and scope of the disclosure as defined by the appended claims and any equivalents thereof.

What is claimed is:

1. A method performed by a hub apparatus, the method comprising:
   receiving a request for a type of service among a plurality of types of services;
   determining sensor types corresponding to the received request for the type of service;
   determining a plurality of devices for performing the received request for the type of service based on the determined sensor types, wherein each of the plurality of devices includes at least one of the determined sensor types;
   receiving respective state information of the each of the plurality of devices from the each of the plurality of devices, wherein the respective state information comprises use history information, battery information and location information of the each of the plurality of devices;
   selecting at least one device from among the plurality of devices based on the respective state information received from the each of the plurality of devices;
   grouping the selected at least one device to a group, wherein the group includes at least one device, from among the plurality of devices, for performing the requested service;
   setting a sensing condition based on environmental information received from an external source, wherein the sensing condition comprises at least one of a sensing period, a sensing starting time, a sensing ending time, and a sensing information transmission condition;
   transmitting a signal for requesting sensing information with the sensing condition to the at least one device in the group;
   in response to receiving the sensing information, which is obtained according to the sensing condition, from the at least one device in the group, performing the requested type of service based on the received sensing information, wherein the sensing information is sensed by at least one sensor of the at least one device in the group, and
   registering the at least one device using a user terminal,
   wherein determining the plurality of devices comprises, when determining that less than a predetermined time has elapsed since the group was formed, identifying pre-stored sensing information from at least one previously used sensor, and based on the pre-stored sensing information, determining the plurality of devices which provide the sensing information from the at least one sensor except the pre-stored sensing information from the at least one previously used sensor without determining a device which provides the pre-stored sensing information,
   wherein the at least one device in the group is selected while excluding at least one device which has been used during a predetermined time from the group based on the use history information,
   wherein the at least one device in the group is selected such that the group includes a minimum number of devices for performing the received request, and
   wherein registering the at least one device comprises receiving, from the user terminal, information on the at least one device, service information, and security information from the at least one device.

2. The method of claim 1, wherein performing the requested type of service comprises performing the requested type of service further based on the pre-stored sensing information.

3. The method of claim 1, wherein selecting the at least one device comprises selecting the at least one device comprising a previously used sensor.

4. The method of claim 1, further comprising determining the at least one device including the sensor based on the information on the at least one device, the service information, and the user information.

5. A hub apparatus, comprising:
   a communicator configured to receive a request for a type of service among a plurality of types of services; and
   a processor configured to:

determine sensor types corresponding to the received request for the type of service, determine a plurality of devices for performing the received request for the type of service based on the determined sensor types, wherein each of the plurality of devices includes at least one of the determined sensor types, control the communicator to receive respective state information of the each of the plurality of devices from each of the plurality of devices, wherein the respective state information comprises use history information, battery information and location information, select at least one device from among the plurality of devices based on the respective state information received from each of the plurality of devices, group the selected at least one device to a group, wherein the group includes at least one device, from among the plurality of devices, for performing the requested service, set a sensing condition based on environmental information received from an external source, wherein the sensing condition comprises at least one of a sensing period, a sensing starting time, a sensing ending time, and a sensing information transmission condition, control the communicator to transmit a signal for requesting sensing information with the sensing condition to the at least one device in the group, and in response to receiving the sensing information, which is obtained according to the sensing condition, from the at least one device in the group, perform the requested type of service based on the received sensing information, wherein the sensing information is sensed by at least one sensor of the at least one device in the group, wherein the processor is further configured to:
when determining that less than a predetermined time has elapsed since the group was formed, identify pre-stored sensing information from at least one previously used sensor, based on the pre-stored sensing information, determine the plurality of devices which provide the sensing information from the at least one sensor except the pre-stored sensing information from the at least one previously used sensor without determining a device which provides the pre-stored sensing information, select the at least one device in the group while excluding at least one device which has been used during a predetermined time from the group based on the use history information, select the at least one device in the group such that the group includes a minimum number of devices for performing the received request, and register the at least one device using a user terminal, wherein the at least one device is registered by receiving, from the user terminal, information on the at least one device, service information, and security information from the at least one device.

6. A method for a hub apparatus, the method comprising:
receiving state information from a first device among a plurality of devices, wherein the state information comprises use history information, battery information and location information;

determining a type of service to be performed among a plurality of types of services based on the received state information;

determining sensor types corresponding to the determined type of service;

determining the plurality of devices for performing the received request for the type of service based on the determined sensor types, wherein each of the plurality of devices includes at least one of the determined sensor types;

selecting at least one second device from among the plurality of devices based on the state information received from the first device among the plurality of devices;

grouping the selected at least one second device to a group, wherein the group includes at least one device, from among the plurality of devices, for performing the requested service;

setting a sensing condition based on environmental information received from an external source, wherein the sensing condition comprises at least one of a sensing period, a sensing starting time, a sensing ending time, and a sensing information transmission condition;

transmitting a signal for requesting sensing information which is obtained according to the at least one second device in the group;

in response to receiving the sensing information, which is obtained according to the sensing condition, from the at least one second device in the group, performing the determined type of service, based on the received sensing information, wherein the sensing information is sensed by at least one sensor of the at least one second device in the group, and registering the at least one device using a user terminal, wherein determining the plurality of devices comprises, when determining that less than a predetermined time has elapsed since the group was formed, identifying pre-stored sensing information from at least one previously used sensor, and based on the pre-stored sensing information, determining the plurality of devices which provide the sensing information from the at least one sensor except the pre-stored sensing information from the at least one previously used sensor without determining a device which provides the pre-stored sensing information, wherein the at least one device in the group is selected while excluding at least one device which has been used during a predetermined time from the group based on the use history information, wherein the at least one device in the group is selected such that the group includes minimum a number of devices for performing the received request, and wherein the at least one device is registered by receiving, from the user terminal, information on the at least one device, service information, and security information from the at least one device.

7. The method of claim 6, wherein the state information further comprises mode information of the first device and location information of the first device.

8. The method of claim 7, wherein determining a type of service to be performed further comprises:
determining whether a mode of the first device is a first mode or a second mode, based on the mode information of the first device;

determining a first service corresponding to the first mode as the type of service to be performed, when it is determined that the mode of the first device is the first mode; and determining a second service corresponding to the second mode as the type of service to be performed, when it is determined that the mode of the first device is the second mode.

9. The method of claim 7, wherein determining a type of service to be performed further comprises:
determining whether the first device is located in a first area or a second area, based on the location information of the first device;
determining a first service corresponding to the first area as the type of service to be performed, when it is determined that the first device is located in the first area; and
determining a second service corresponding to the second area as the type of service to be performed, when it is determined that the first device is located in the second area.

10. The method of claim 7, wherein receiving the state information from the first device comprises:
detecting a location movement of the first device through a beacon signal; and
acquiring the location information of the first device.

11. The method of claim 6, wherein performing the determined type of service comprises:
generating a control command based on the received sensing information; and
transmitting the control command to the first device.

12. The method of claim 6, wherein the first device is designated by a user from among the plurality of devices.

\* \* \* \* \*